United States Patent
Chen et al.

(10) Patent No.: US 11,886,274 B2
(45) Date of Patent: Jan. 30, 2024

(54) METHODS AND DEVICES FOR VOLTAGE SCALING FOR A PROCESSOR BASED ON PREDICTED OPERATING FREQUENCY

(71) Applicant: HUAWEI TECHNOLOGIES CO., LTD., Guangdong (CN)

(72) Inventors: Zhongjian Chen, Hangzhou (CN); Xiaokun Wang, Shenzhen (CN); Shibin Xu, Dongguan (CN); Nianbing Li, Shenzhen (CN); Liangyi Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/834,710

(22) Filed: Jun. 7, 2022

(65) Prior Publication Data

US 2022/0300064 A1  Sep. 22, 2022

Related U.S. Application Data

(63) Continuation of application No. PCT/CN2020/109898, filed on Aug. 18, 2020.

(30) Foreign Application Priority Data

Dec. 9, 2019 (CN) .......................... 201911252945.1

(51) Int. Cl.
  *G06F 1/32*  (2019.01)
  *G06F 1/26*  (2006.01)
  (Continued)

(52) U.S. Cl.
  CPC .............. *G06F 1/3296* (2013.01); *G06F 1/26* (2013.01); *G06F 1/324* (2013.01); *G06F 1/3206* (2013.01)

(58) Field of Classification Search
  None
  See application file for complete search history.

(56) References Cited

U.S. PATENT DOCUMENTS 7,308,590 B2   12/2007  Zagacki
8,051,307 B2 *  11/2011  Huang ................. G06F 1/3243
                                                                702/65
(Continued)

FOREIGN PATENT DOCUMENTS

CN          1991687 A      7/2007
CN        101387905 B      7/2011
(Continued)

*Primary Examiner* — Nitin C Patel
(74) *Attorney, Agent, or Firm* — WOMBLE BOND DICKINSON (US) LLP

(57) ABSTRACT

This application discloses a voltage scaling method and an electronic device. The method is applied to an electronic device having a processor and a power supply that supplies power to the processor. The method includes the processor sending power supply scaling information to the power supply based on an operating frequency in a next time period. The method further includes the power supply determining, based on the power supply scaling information, a supply voltage $V_{out}$ used to supply power to the processor. The supply voltage $V_{out}$ decreases as a load current of the power supply increases. $V_{min} \leq V_{out} \leq V$, where $V_{min}$ is a lowest supply voltage of the processor at the operating frequency in the next time period, and V is a specified supply voltage of the processor at the operating frequency in the next time period.

20 Claims, 15 Drawing Sheets

(51) Int. Cl.
    *G06F 1/3296*     (2019.01)
    *G06F 1/3206*     (2019.01)
    *G06F 1/324*     (2019.01)

(56) References Cited

U.S. PATENT DOCUMENTS

| | | |
|---|---|---|
| 2007/0250219 A1 | 10/2007 | Gaskins et al. |
| 2008/0122412 A1 | 5/2008 | Burton et al. |
| 2011/0080202 A1* | 4/2011 | Moore .................. H03K 3/012 327/261 |
| 2017/0168534 A1 | 6/2017 | Lefurgy et al. |
| 2017/0255251 A1 | 9/2017 | Zhang et al. |

FOREIGN PATENT DOCUMENTS

| | | |
|---|---|---|
| CN | 103425223 A | 12/2013 |
| CN | 104969142 B | 9/2017 |
| TW | 470875 B | 1/2002 |

* cited by examiner

METHODS AND DEVICES FOR VOLTAGE SCALING FOR A PROCESSOR BASED ON PREDICTED OPERATING FREQUENCY

CROSS-REFERENCE TO RELATED APPLICATIONS

This application is a continuation of International Application No. PCT/CN2020/109898, filed on Aug. 18, 2020, which claims priority to Chinese Patent Application No. 201911252945.1, filed on Dec. 9, 2019. The disclosures of the aforementioned applications are hereby incorporated by reference in their entireties.

TECHNICAL FIELD

This application relates to the field of electronic technologies, and in particular, to a voltage scaling method and an electronic device.

BACKGROUND

Moore's law for circuits is a law that reveals the rate of progress in information technologies. Its content is as follows: When the price remains unchanged, a quantity of components that can be accommodated on an integrated circuit increases by one time about every 18-24 months, and performance also improves by one time. In other words, computer performance you can buy per dollar will improve by more than one time every 18-24 months.

In recent years, with an increasing working frequency and integration degree of the integrated circuit, power consumption of the integrated circuit rapidly increases, which makes it difficult for the integrated circuit to continue to adapt to Moore's law for circuits. Consequently, the processor performance and integration degree cannot be improved, and cooling costs are increased.

To resolve the foregoing problems, a dynamic voltage and frequency scaling (DVFS) technology is used. This technology aims at reducing power consumption of a processor by scaling a supply voltage supplied by a power supply to a processor. Specifically, an operating frequency and a supply voltage of the processor are reduced when the processor has a light load; and the operating frequency and the supply voltage of the processor are increased when the processor has a heavy load. However, when the processor has a heavy load, the DVFS technology cannot reduce the supply voltage of the processor. Consequently, an effect of the DVFS technology in reducing power consumption is not obvious.

SUMMARY

This application provides a voltage scaling method and an electronic device, to ensure that power consumption can be reduced and performance can be improved for a processor in cases of a light load and a heavy load.

To resolve the foregoing technical problem, embodiments of this application provide the following technical solutions:

According to a first aspect, an embodiment of this application provides a voltage scaling method, applied to an electronic device having a processor and a power supply that supplies power to the processor. The method includes: The processor sends power supply scaling information to the power supply based on an operating frequency in a next time period, where the power supply scaling information includes a specified supply voltage V of the operating frequency in the next time period, and the operating frequency in the next time period is an operating frequency predicted based on a current operating frequency; and the power supply provides a supply voltage $V_{out}$ to the processor based on the specified supply voltage V of the operating frequency in the next time period and a specified voltage slope R of the operating frequency in the next time period. The voltage slope is a decrease speed of the supply voltage $V_{out}$ as a load current of the power supply increases. The supply voltage $V_{out}$ decreases as the load current increases. $V_{min} \leq V_{out} \leq V$, where $V_{min}$ is a lowest supply voltage for normal operation of the processor as the load current increases when the processor operates at the operating frequency in the next time period.

In the method provided in this application, the operating frequency in the next time period is the operating frequency predicted based on the current operating frequency, and the supply voltage $V_{out}$ provided by the power supply to the processor based on the specified supply voltage V of the operating frequency in the next time period and the specified voltage slope R of the operating frequency in the next time period adapts to the operating frequency in the next time period of the processor. In addition, the load current has a feature of periodically increasing from a minimum value to a maximum load current. Therefore, in prior approaches, when the power supply outputs a load voltage in a constant voltage manner, the load voltage passively decreases in a process in which the load current increases. However, according to the method provided in this application, the supply voltage $V_{out}$ output by the power supply is controlled to actively decrease as the load current increases, so that when the load current starts to rise, the supply voltage $V_{out}$ output by the power supply actively decreases as the load current increases. In this case, the supply voltage $V_{out}$ is less than the specified supply voltage V of the processor at the operating frequency in the next time period and is greater than or equal to the lowest supply voltage $V_{min}$ for normal operation of the processor as the load current increases when the processor operates at the operating frequency in the next time period. It can be learned that, compared with prior approaches, this application provides the method in which the supply voltage $V_{out}$ provided by the power supply can ensure normal operating of the processor while reducing power consumption of the processor, thereby improving processor performance. In addition, a higher operating frequency of the processor results in a higher load amount of the processor. Therefore, according to the method provided in this application, regardless of the load amount of the processor, when the load current increases, the power supply can supply power to the processor at a voltage lower than a specified supply voltage of the current operating frequency, so that the processor has relatively low power consumption while operating normally.

In some possible embodiments, before the processor sends the power supply scaling information to the power supply based on the operating frequency in the next time period, the method further includes: The processor predicts a load amount in the next time period based on a current load amount, and determines the operating frequency in the next time period based on the load amount in the next time period. For example, a correspondence table between a load amount and an operating frequency is stored in a built-in memory of a mainboard or the processor, and the operating frequency in the next time period is queried in the correspondence table between a load amount and an operating frequency based on the predicted load amount in the next time period.

In some possible embodiments, the method further includes: When determining that the operating frequency in the next time period is not equal to the current operating frequency, the processor sets the current operating frequency to be equal to the operating frequency in the next time period. Because supply voltage scaling and operating frequency scaling are interdependent, that when determining that the operating frequency in the next time period is not equal to the current operating frequency, the processor sets the current operating frequency to be equal to the current operating frequency in the next time period includes: When the processor determines that the operating frequency in the next time period is less than the current operating frequency, the processor sets the current operating frequency to be equal to the operating frequency in the next time period before sending the power supply scaling information to the power supply based on the operating frequency in the next time period; and when the processor determines that the operating frequency in the next time period is greater than the current operating frequency, the processor sets the current operating frequency to be equal to the operating frequency in the next time period after the power supply provides the supply voltage $V_{out}$ to the processor based on the specified supply voltage V of the operating frequency in the next time period and the specified voltage slope R of the operating frequency in the next time period.

In some possible embodiments, the supply voltage $V_{out}=V-I*R$, where I is the load current of the power supply. It may be learned from the formula for calculating the supply voltage $V_{out}$ that the supply voltage $V_{out}$ is determined by the specified voltage slope R of the processor in the next time period, the specified supply voltage V in the next time period, and the load current I. The voltage slope refers to the decrease speed of the supply voltage as the load current of the power supply increases. Therefore, the product of the specified voltage slope R of the operating frequency in the next time period and the load current I is essentially an active decrease amount of the supply voltage when the load current of the power supply increases. Provided that it is ensured that the active decrease amount is greater than or equal to a maximum passive decrease amount of the load voltage when the load current increases in the prior approaches, the supply voltage $V_{out}$ can be enabled to be always greater than or equal to a lowest supply voltage $V_{min}$ for normal operation of the processor as the load current increases when the processor operates in the next time period.

In some possible embodiments, the specified supply voltage V of the operating frequency in the next time period may be provided by the processor, and the specified voltage slope R of the operating frequency in the next time period may exist in the power supply, or may be provided by the processor. When the processor provides only the specified supply voltage V of the operating frequency in the next time period to the power supply, the processor does not need to dynamically specify the specified voltage slope R of the operating frequency in the next time period in the power supply over a communications interface between the processor and the power supply, thereby effectively reducing a communication delay and a voltage scaling delay, and increasing a voltage scaling speed.

In some possible embodiments, that the processor sends the power supply scaling information to the power supply based on the operating frequency in the next time period includes: The processor searches a target correspondence for the specified supply voltage V of the operating frequency in the next time period based on the operating frequency in the next time period, and sends the specified supply voltage V of the operating frequency in the next time period to the power supply. The target correspondence herein is a correspondence among an operating frequency, a specified supply voltage, and a specified voltage slope that are of the processor. Certainly, the target correspondence may alternatively be a correspondence between an operating frequency and a specified supply voltage that are of the processor. In this case, the processor only needs to query the specified supply voltage of the operating frequency in the next time period from the target correspondence, and send the specified supply voltage of the operating frequency in the next time period to the power supply. In this way, a communication delay and a voltage scaling delay can be reduced, and a voltage scaling time can be shortened.

In some possible embodiments, when the processor provides only the specified supply voltage V of the operating frequency in the next time period to the power supply, the specified voltage slope R of the operating frequency in the next time period may exist in the power supply in a form of a constant voltage slope. The existence manner may be a storage manner. The constant voltage slope is a minimum value $R_{min}$ in voltage slopes allowed by the processor at specified supply voltages of all operating frequencies, where $R_{min}>0$. Because $R_{min}>0$, it can be ensured that when the processor operates at any load amount or operating frequency, the power supply can always provide a supply voltage less than or equal to the specified supply voltage to the processor, so that the processor has relatively low energy consumption. In addition, the constant voltage slope is a minimum value $R_{min}$ in measured voltage slopes of the processor at all operating frequencies. Therefore, when the constant voltage slope is the specified voltage slope R of the operating frequency in the next time period, a product of the specified voltage slope of the operating frequency in the next time period and the load current may be controlled. In this way, the processor operates normally, and a case in which the processor cannot operate normally at the supply voltage $V_{out}$ as the load current increases when the constant voltage slope has a relatively large value is avoided.

In some possible embodiments, when the specified voltage slope R of the operating frequency in the next time period is provided by the processor, the power supply scaling information includes not only the specified supply voltage V of the operating frequency in the next time period, but also the specified voltage slope R of the operating frequency in the next time period.

In some possible embodiments, when the specified voltage slope R of the operating frequency in the next time period is provided by the processor, that the processor sends the power supply scaling information to the power supply based on the operating frequency in the next time period includes: The processor searches a target correspondence for the specified supply voltage V of the operating frequency in the next time period and the specified voltage slope R of the operating frequency in the next time period based on the operating frequency in the next time period, and sends the specified supply voltage V of the operating frequency in the next time period and the specified voltage slope R of the operating frequency in the next time period to the power supply. The target correspondence is a correspondence among an operating frequency, a specified supply voltage, and a specified voltage slope that are of the processor.

In a possible embodiment, the specified voltage slope of the processor at each operating frequency is a voltage slope allowed by the processor at a specified supply voltage of the operating frequency. In other words, a specified voltage slope of each operating frequency in the target correspondence is the voltage slope allowed by the processor at the specified supply voltage of the operating frequency. In this case, the specified supply voltage V in the next time period better matches the specified voltage slope R in the next time period, so that when the supply voltage $V_{out}$ provided by the power supply to the processor meets normal operation of the processor, optimal power consumption of the processor is ensured.

In a possible embodiment, specified voltage slopes of the processor at all operating frequencies are equal to a constant voltage slope. The constant voltage slope is a minimum value $R_{min}$ in voltage slopes allowed by the processor at specified supply voltages of all operating frequencies, where $R_{min} > 0$. In other words, the specified voltage slopes of all the operating frequencies in the target correspondence are equal to a constant voltage slope. When the processor sends the specified supply voltage V of the operating frequency in the next time period and the specified voltage slope R of the operating frequency in the next time period to the power supply for the first time, the power supply may store the specified voltage slope R of the operating frequency in the next time period in a form of a constant voltage slope. However, the specified voltage slopes of all the operating frequencies in the target correspondence are equal to a constant voltage slope. Therefore, the power supply essentially stores the specified voltage slopes of all the operating frequencies in the target correspondence in a form of a constant voltage slope. When the power supply needs to scale the supply voltage $V_{out}$ to be provided to the processor again, the processor only needs to query the target correspondence for the specified supply voltage V of the operating frequency in the next time period, and send the specified supply voltage V of the operating frequency in the next time period to the power supply, so that the power supply scales a reference voltage based on the specified supply voltage V of the operating frequency in the next time period. In this process, the processor only needs to dynamically specify a reference voltage in the power supply based on the operating frequency in the next time period by using a bus interface, so as to reduce a communication delay and a voltage scaling delay, thereby shortening voltage scaling duration. In addition, because the constant voltage slope is a minimum value $R_{min}$ in voltage slopes allowed by the processor at specified supply voltages of all operating frequencies, and $R_{min} > 0$, it can be ensured that the supply voltage $V_{out}$ provided by the power supply to the processor always meets $V_{min} \leq V_{out} \leq V$ when the processor operates at any load amount or operating frequency, so that the processor has relatively low energy consumption while operating normally.

In some possible embodiments, the voltage slope allowed by the processor at the specified supply voltage of each operating frequency is $R_{(i)} = R_{max(i)} - \Delta R_{(i)}$, where $R_{max(i)}$ is a maximum voltage slope of the processor at the specified supply voltage of each operating frequency, and $\Delta R_{(i)}$ is a voltage slope margin of the processor at each operating frequency. In this case, because $R_{max(i)}$ is the maximum voltage slope of the processor at the specified supply voltage of each operating frequency, when the load current increases, the supply voltage $V_{out}$ provided by the power supply to the processor can be as close to $V_{min}$ as possible, thereby ensuring that the processor operates with lower power consumption. In addition, if $R_{(i)} = R_{max(i)}$, when the load current increases, the supply voltage $V_{out}$ is easily caused to be slightly lower than $V_{min}$, and consequently, the processor cannot operate normally. Based on this, the voltage slope margin may be subtracted from $R_{max(i)}$, so as to ensure that the processor operates normally with relatively low power consumption.

In a possible embodiment, the specified supply voltage of the processor at each operating frequency is $V_{(i)}$. That is, the specified supply voltage of each operating frequency in the target correspondence is $V_{(i)}$. $V_{(i)} = V_{min(i)} + \Delta V_{(i)}$, where $V_{min(i)}$ is a lowest supply voltage for normal operation of the processor as the load current increases when the processor operates at each operating frequency, and $\Delta V_{(i)}$ is a supply voltage margin of the processor at each operating frequency. In this case, the specified supply voltage V of the operating frequency in the next time period that is searched by the processor is slightly greater than the lowest supply voltage $V_{min}$ for normal operation of the processor as the load current increases when the processor operates at the operating frequency in the next time period, so that the supply voltage $V_{out}$ provided by the power supply to the processor can ensure that the processor operates normally with relatively low power consumption.

In a possible embodiment, before the processor sends the power supply scaling information to the power supply based on the operating frequency in the next time period, the method further includes: The processor calibrates the target correspondence based on performance difference information, so that a calibrated target correspondence matches the processor included in the electronic device, thereby improving voltage scaling reliability and accuracy. The performance difference information may be detected by a built-in critical path monitor (CPM for short) circuit of the processor. The CPM circuit is configured to simulate a timing critical path of the reference processor. The performance difference information may be a delay level (such as a delay time) or an oscillation frequency determined by the CPM circuit. The processor has different delay levels or oscillation frequencies in different environments, and therefore, lowest supply voltages of the processor are also different at a given operating frequency.

In a possible embodiment, to cooperate with the processor to calibrate the target correspondence based on the performance difference information, a correspondence should also be pre-stored. The correspondence can be a correspondence between performance differences and lowest supply voltage differences that are of a plurality of processors in a case of not considering temperature impact or a correspondence between performance differences and lowest supply voltage differences that are of a plurality of processors within a plurality of temperature intervals in a case of considering temperature impact. For example, when the target correspondence is a target correspondence of the reference processor, a performance difference of each processor may be represented by a delay level (such as a delay time) or an oscillation frequency of the processor, or may be indirectly represented by a delay difference or an oscillation frequency difference between the processor and the reference processor at a same voltage. A lowest supply voltage difference corresponding to the performance difference of each processor refers to a lowest supply voltage difference between the processor and the reference processor at a same operating frequency. The reference processor is a processor with worst performance in a plurality of processors. That is, the reference processor is a processor with a maximum lowest supply voltage in a plurality of processors at a same operating frequency.

When temperature impact is not considered, the performance difference information is detected by the CPM circuit, and that the processor calibrates the target correspondence based on the performance difference information, so that the target correspondence matches the processor included in the electronic device includes: The processor searches the correspondence between performance differences and lowest supply voltage differences that are of a plurality of processors for a lowest supply voltage difference based on the performance difference information; and calibrates a specified supply voltage corresponding to each operating frequency in the target correspondence based on the lowest supply voltage difference, so that a calibrated target correspondence matches the processor included in the electronic device.

When temperature impact is considered, the performance difference information is detected by the CPM circuit, and that the processor calibrates the target correspondence based on the performance difference information, so that the target correspondence matches the processor included in the electronic device includes: The processor searches, based on a current temperature, the correspondence between performance differences and lowest supply voltage differences that are of a plurality of processors within a plurality of temperature intervals for a correspondence between performance differences and lowest supply voltage differences that are of a plurality of processors within a temperature interval of the current temperature; searches, based on the performance difference information, the correspondence between performance differences and lowest supply voltage differences that are of a plurality of processors within the temperature interval of the current temperature for a lowest supply voltage difference that matches the performance difference information; and calibrates a specified supply voltage corresponding to each operating frequency in the target correspondence based on the lowest supply voltage difference that matches the performance difference information, so that a calibrated target correspondence matches the processor included in the electronic device.

In a possible embodiment, the electronic device includes a storage medium. The storage medium may exist independently of the processor, or may be built into the processor. The target correspondence may be directly or indirectly stored in the storage medium in a plurality of manners. Certainly, the storage medium may further store the correspondence between performance differences and lowest supply voltage differences that are of a plurality of processors, or the correspondence between performance differences and lowest supply voltage differences that are of a plurality of processors within a plurality of temperature intervals. For example, the correspondence between performance differences and lowest supply voltage differences that are of a plurality of processors may be stored in the storage medium in a form of a relationship table or a function relational expression. The correspondence between performance differences and lowest supply voltage differences that are of a plurality of processors within a plurality of temperature intervals is stored in the storage medium in a form of a relationship table or a function relational expression.

In a possible embodiment, the target correspondence is stored in the storage medium. The target correspondence is a target correspondence of a reference processor. The reference processor is a processor with a maximum lowest supply voltage in a plurality of processors at a same operating frequency, that is, the reference processor is a processor with worst performance in the plurality of processors. In this case, a specified supply voltage and a specified voltage slope that are corresponding to each operating frequency in the target correspondence may meet voltage scaling of a plurality of processors. Therefore, the target correspondence of the reference processor is widely applicable. It should be understood that a plurality of processors may be differentiated based on a production process, an aging degree, or the like. Regardless of different production processes or different aging degrees, they are finally reflected by using performance difference information. For example, for processors of a same model, different batches of processors are slightly different in a production process, and therefore, different batches of processors of a same model belong to different types.

In a possible embodiment, the target correspondence is stored in the storage medium. The target correspondence is a target correspondence of the processor included in the electronic device in which the storage medium is located. The target correspondence may be debugged and measured after the electronic device is delivered from the factory, and stored in the storage medium.

In a possible embodiment, the electronic device further includes a storage medium. The storage medium stores target correspondences of a reference processor within a plurality of temperature intervals. For a definition of the reference processor, refer to the foregoing description. In this case, before the processor sends the power supply scaling information to the power supply based on the operating frequency in the next time period, the method further includes: The processor searches, based on a current temperature, the target correspondences of the reference processor within a plurality of temperature intervals for a target correspondence. The target correspondence is a target correspondence of the reference processor within a temperature interval of the current temperature. In this case, if the searched target correspondence is calibrated, the calibrated target correspondence can better match the processor.

In a possible embodiment, on the premise of not considering temperature impact, the electronic device is powered on, and the CPM circuit detects performance difference information. Before the processor sends the power supply scaling information to the power supply based on the operating frequency in the next time period, the method further includes: The processor searches, based on the performance difference information, target correspondences of a plurality of processors for a target correspondence that matches the processor included in the electronic device. The difference information of the processor corresponding to the target correspondence is better matched with the difference information tested by the CPM circuit.

When temperature impact is considered, and the electronic device is powered on, the CPM circuit detects the performance difference information, and before the processor sends the power supply scaling information to the power supply based on the operating frequency in the next time period, the method further includes: The processor searches, based on a current temperature, target correspondences of a plurality of processors within a plurality of temperature intervals for target correspondences of the plurality of processors within a temperature interval of the current temperature; and searches, based on performance difference information, the target correspondences of the plurality of processors within the temperature interval of the current temperature for a target correspondence that matches the processor included in the electronic device.

In a possible embodiment, to cooperate with the processor to search for the target correspondence that matches the processor included in the electronic device, the electronic device includes a storage medium. When temperature impact is not considered, the electronic device further includes a storage medium. Before factory delivery, the CPM circuit may be used to measure performance difference information of a plurality of processors and target correspondences of the plurality of processors, establish a relationship between the two, and store the performance difference information of the plurality of processors and the target correspondences of the plurality of processors in the storage medium. On the premise of considering temperature impact, before factory delivery, the CPM circuit may be used to measure performance difference information of a plurality of processors within a plurality of temperature intervals and target correspondences of the plurality of processors within the plurality of temperature intervals and establish an interdependence relationship between the performance difference information of the plurality of processors within the plurality of temperature intervals and the target correspondences of the plurality of processors within the plurality of temperature intervals. Then, the performance difference information of the plurality of processors within the plurality of temperature intervals and the target correspondences of the plurality of processors within the plurality of temperature intervals are stored in the storage medium.

According to a second aspect, this application provides an electronic device. The electronic device includes a processor, configured to send power supply scaling information to a power supply based on an operating frequency in a next time period, where the power supply scaling information includes a specified supply voltage V of the operating frequency in the next time period, and the operating frequency in the next time period is an operating frequency predicted based on a current operating frequency; and the power supply, configured to provide a supply voltage $V_{out}$ to the processor based on the specified supply voltage V of the operating frequency in the next time period and a specified voltage slope R of the operating frequency in the next time period. The voltage slope is a decrease speed of the supply voltage $V_{out}$ as a load current of the power supply increases; the supply voltage $V_{out}$ decreases as the load current of the power supply increases; and $V_{min} \leq V_{out} \leq V$, where $V_{min}$ is a lowest supply voltage for normal operation of the processor as the load current increases when the processor operates at the operating frequency in the next time period.

In a possible embodiment, the processor is further configured to: before sending the power supply scaling information to the power supply based on the operating frequency in the next time period, predict a load amount in the next time period based on a current load amount, and determine the operating frequency in the next time period based on the load amount in the next time period.

In some possible embodiments, the processor is further configured to: when determining that the operating frequency in the next time period is not equal to the current operating frequency, set the current operating frequency to be equal to the operating frequency in the next time period. For example, the processor is further configured to: when determining that the operating frequency in the next time period is less than the current operating frequency, set the current operating frequency to be equal to the operating frequency in the next time period before sending the power supply scaling information to the power supply based on the operating frequency in the next time period. After the power supply provides the supply voltage $V_{out}$ to the processor based on the specified supply voltage V of the operating frequency in the next time period and the specified voltage slope R of the operating frequency in the next time period, the processor is specifically configured to: when determining that the operating frequency in the next time period is greater than the current operating frequency, set the current operating frequency to be equal to the operating frequency in the next time period.

In a possible embodiment, the supply voltage $V_{out}$=V−I*R, where I is the load current of the power supply.

In a possible embodiment, the processor is specifically configured to search a target correspondence for the specified supply voltage V of the operating frequency in the next time period based on the operating frequency in the next time period, and send the specified supply voltage V of the operating frequency in the next time period to the power supply. The target correspondence is a correspondence among an operating frequency, a specified supply voltage, and a specified voltage slope that are of the processor, or a correspondence between an operating frequency and a specified supply voltage that are of the processor.

In a possible embodiment, the specified voltage slope of the operating frequency in the next time period exists in the power supply in a form of a constant voltage slope. The constant voltage slope is a minimum value $R_{min}$ in voltage slopes allowed by the processor at specified supply voltages of all operating frequencies, where $R_{min}$>0.

In a possible embodiment, the power supply scaling information further includes the specified voltage slope R of the operating frequency in the next time period.

In a possible embodiment, the processor is specifically configured to: search a target correspondence for the specified supply voltage V of the operating frequency in the next time period and the specified voltage slope R of the operating frequency in the next time period based on the operating frequency in the next time period, and send the specified supply voltage V of the operating frequency in the next time period and the specified voltage slope R of the operating frequency in the next time period to the power supply. The target correspondence is a correspondence among an operating frequency, a specified supply voltage, and a specified voltage slope that are of the processor.

In a possible embodiment, the specified voltage slope of the processor at each operating frequency is a voltage slope allowed by the processor at a specified supply voltage of the operating frequency.

In a possible embodiment, specified voltage slopes of the processor at all operating frequencies are equal to a constant voltage slope. The constant voltage slope is a minimum value $R_{min}$ in voltage slopes allowed by the processor at specified supply voltages of all operating frequencies, where $R_{min}$>0.

In a possible embodiment, the voltage slope allowed by the processor at the specified supply voltage of each operating frequency is $R_{(i)}$, $R_{(i)}=R_{max(i)}-\Delta R_{(i)}$, $R_{max(i)}$ is a maximum voltage slope of the processor at the specified supply voltage of each operating frequency, and $\Delta R_{(i)}$ is a voltage slope margin of the processor at each operating frequency.

In a possible embodiment, the specified supply voltage of the processor at each operating frequency $V_{(i)}=V_{min(i)}+\Delta V_{(i)}$, $V_{min(i)}$ is a lowest supply voltage for normal operation of the processor as the load current increases when the processor operates at each operating frequency, and $\Delta V_{(i)}$ is a supply voltage margin of the processor at each operating frequency.

In a possible embodiment, the processor is further configured to: before sending the power supply scaling information to the power supply based on the operating frequency in the next time period, calibrate the target correspondence based on performance difference information, so that a calibrated target correspondence matches the processor included in the electronic device.

In a possible embodiment, on the premise of not considering temperature impact, the processor is specifically configured to: search a correspondence between performance differences and lowest supply voltage differences that are of a plurality of processors for a lowest supply voltage difference based on the performance difference information; and calibrate a specified supply voltage corresponding to each operating frequency in the target correspondence based on the lowest supply voltage difference, so that a calibrated target correspondence matches the processor included in the electronic device.

On the premise of considering temperature impact, the processor is specifically configured to: search, based on a current temperature, a correspondence between performance differences and lowest supply voltage differences that are of a plurality of processors within a plurality of temperature intervals for a correspondence between performance differences and lowest supply voltage differences that are of a plurality of processors within a temperature interval of the current temperature; search, based on the performance difference information, the correspondence between performance differences and lowest supply voltage differences that are of a plurality of processors within the temperature interval of the current temperature for a lowest supply voltage difference that matches the current performance difference information; and calibrates, based on the lowest supply voltage difference that matches the performance difference information, a specified supply voltage corresponding to each operating frequency in the target correspondence, so that a calibrated target correspondence matches the processor included in the electronic device.

In a possible embodiment, the electronic device includes a storage medium. The storage medium may exist independently of the processor, or may be built into the processor. The target correspondence may be directly or indirectly stored in the storage medium in a plurality of manners. Certainly, the storage medium may further store the correspondence between performance differences and lowest supply voltage differences that are of a plurality of processors, or the correspondence between performance differences and lowest supply voltage differences that are of a plurality of processors within a plurality of temperature intervals. For example, the correspondence between performance differences and lowest supply voltage differences that are of a plurality of processors may be stored in the storage medium in a form of a relationship table or a function relational expression. The correspondence between performance differences and lowest supply voltage differences that are of a plurality of processors within a plurality of temperature intervals is stored in the storage medium in a form of a relationship table or a function relational expression.

In a possible embodiment, the target correspondence is stored in a storage medium, and the target correspondence is a target correspondence of a reference processor. The reference processor is a processor with a maximum lowest supply voltage in a plurality of processors at a same operating frequency.

In a possible embodiment, the target correspondence is stored in the storage medium. The target correspondence is a target correspondence of the processor included in the electronic device in which the storage medium is located. The target correspondence may be debugged and measured after the electronic device is delivered from the factory, and stored in the storage medium.

In a possible embodiment, the electronic device further includes a storage medium. The storage medium stores target correspondences of a reference processor within a plurality of temperature intervals. The reference processor is a processor with a maximum lowest supply voltage in a plurality of processors at a same operating frequency. The processor is further configured to: before sending the power supply scaling information to the power supply based on the operating frequency in the next time period, search, based on a current temperature, the target correspondences of the reference processor within a plurality of temperature intervals for a target correspondence. The target correspondence is a target correspondence of the reference processor within a temperature interval of the current temperature.

In a possible embodiment, on the premise of not considering temperature impact, the processor is further configured to: before sending the power supply scaling information to the power supply based on the operating frequency in the next time period, search, based on performance difference information, target correspondences of a plurality of processors for a target correspondence that matches the processor included in the electronic device. On the premise of considering temperature impact, the processor is further configured to: before sending the power supply scaling information to the power supply based on the operating frequency in the next time period, search, based on a current temperature, target correspondences of a plurality of processors within a plurality of temperature intervals for target correspondences of the plurality of processors within a temperature interval of the current temperature; and search, based on performance difference information, the target correspondences of the plurality of processors within the temperature interval of the current temperature for a target correspondence that matches the processor included in the electronic device.

In a possible embodiment, the electronic device includes a storage medium. When temperature impact is not considered, the storage medium stores performance difference information of a plurality of processors and target correspondences of the plurality of processors, and the performance difference information of the plurality of processors and the target correspondence of the plurality of processors are interdependent. On the premise of considering temperature impact, performance difference information of a plurality of processors within a plurality of temperature intervals and target correspondences of a plurality of processors within a plurality of temperature intervals are stored in the storage medium, and the performance difference information of the plurality of processors within the plurality of temperature intervals and the target correspondences of the plurality of processors within the plurality of temperature intervals are interdependent.

According to a third aspect, this application further provides a processor. The processor includes one or more modules, configured to implement the operations performed by the processor in the first aspect, where the one or more modules may correspond to the operations performed by the processor in the method in the first aspect.

According to a fourth aspect, this application provides a power supply. The power supply includes one or more modules, configured to implement the operations performed by the power supply in the first aspect, where the one or more modules may correspond to the operations performed by the power supply in the method in the first aspect.

According to a fifth aspect, this application provides a terminal device. The terminal device includes a processor and a power supply. The processor is configured to perform the operations performed by the processor according to the first aspect or any possible embodiment of the first aspect, and the power supply is configured to perform the operations performed by the power supply according to the first aspect or any possible embodiment of the first aspect.

In some possible embodiments, the terminal device further includes a storage medium, configured to store a computer program and a target correspondence.

According to a sixth aspect, this application provides a communications device, where the communications device includes a processor and a power supply, the processor is configured to perform the operations performed by the processor according to the first aspect or any possible embodiment of the first aspect, and the power supply is configured to perform the operations performed by the power supply according to the first aspect or any possible embodiment of the first aspect.

In some possible embodiments, the communications device further includes a storage medium, configured to store a computer program and a target correspondence.

According to a seventh aspect, this application further provides a chip. The chip includes a processor and a communications interface coupled to the processor interface. The processor is configured to run a computer program or an instruction to implement the operations performed by the processor as described in the first aspect or any possible embodiment of the first aspect.

In a possible embodiment, the chip further includes a memory, configured to store a computer program or instruction and a target correspondence.

According to an eighth aspect, this application further provides a chip. The chip includes a processor and a communications interface coupled to the processor interface. The processor is configured to run a computer program or instruction to implement the operations performed by the power supply as described in the first aspect or any possible embodiment of the first aspect.

In a possible embodiment, the chip further includes a memory, configured to store a computer program.

Any electronic device or processor or power supply or chip or terminal device provided above is used to perform the corresponding method provided above. Therefore, for beneficial effects that can be achieved by the foregoing apparatus or computer storage medium or computer program product or chip or communications system, reference may be made to beneficial effects of the corresponding solution in the corresponding method provided above. Details are not described herein again.

DESCRIPTION OF EMBODIMENTS

Figure 1:
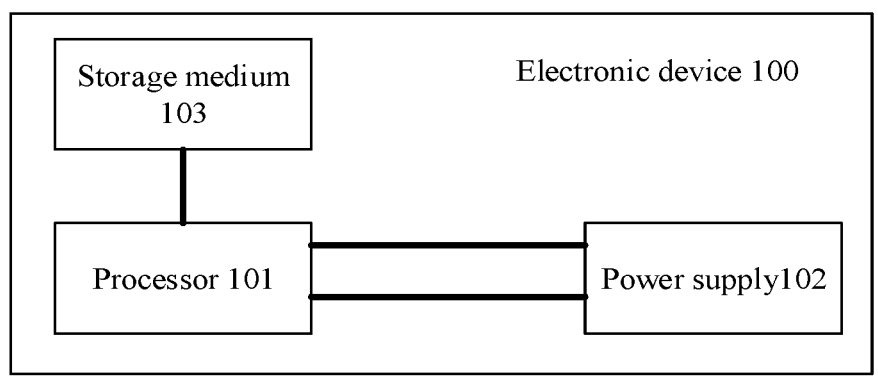
FIG. 1 is a schematic structural diagram of an electronic device according to an embodiment of this application.

Before the embodiments of this application are described, related nouns involved in the embodiments of this application are first explained as follows:

A dynamic voltage and frequency scaling (DVFS) technology means to dynamically scale an operating frequency and a voltage of a chip based on different requirements for a computing capability by application programs running on the chip (for a same chip, a higher frequency requires a higher voltage), so as to achieve an energy saving purpose. Specifically, when a processor has a light load, an operating frequency and a supply voltage of the processor are reduced; and when the processor has a heavy load, the operating frequency and the supply voltage of the processor are increased, so as to reduce power consumption of the processor.

Intel Turbo Boost technology is referred to as Turbo technology. The Turbo technology is an automatic overclocking (OC) technology of a multi-core central processing unit. When a core of the central processing unit does not reach temperature, current, and power consumption specification thresholds, the Turbo technology automatically allows some active cores of the central processing unit to operate above a rated operating frequency, thereby improving processor performance to respond to a peak load.

A basic input/output system (BIOS) is a group of programs that are built into a read-only memory mirroring chip on a mainboard of a computer. The basic input/output system stores a most important basic input/output program of the computer, a power-on self-test program, and a boot loader.

An adaptive voltage scaling (AVS) technology is a real-time closed-loop control power management technology that can continuously scale a supply voltage. The AVS technology may be implemented by using a critical path monitor (CPM) circuit. The CPM circuit is used to simulate a timing critical path of a reference processor, and then determine performance difference information such as a delay level or an oscillation frequency, to adaptively scale a circuit power supply level based on the performance difference information, so as to reduce a voltage as much as possible while ensuring that the delay level or the oscillation frequency meets a system requirement.

A voltage identification (VID) is also referred to as a VID code, which refers to a code representing a voltage value, and is essentially a digitized voltage value.

A voltage regulator module (VRM) is an apparatus that provides a proper supply voltage for a microprocessor, and is also referred to as a VRM power supply. The VRM power supply can identify the VID code to scale an output constant supply voltage, so that the output constant supply voltage is consistent with the voltage value represented by the VID code. Specifically, the VRM power supply integrates an 8-bit VID code, which represents 256 voltage values. A processor sends a VID code to the VRM power supply. The VRM power supply may identify, by using the integrated 8-bit VID code, the VID code sent by the processor, so as to determine the supply voltage.

A loadline is a feature curve on which a supply voltage output by a VRM power supply linearly decreases as a load current increases.

A voltage decrease slope is referred to as a voltage slope or a loadline value, and indicates a linear decrease speed of a supply voltage as a load current of a power supply such as a VRM power supply increases. A larger loadline value indicates a higher linear decrease speed of the supply voltage output by the VRM power supply as the load current increases. A smaller loadline value indicates a lower linear decrease speed of the supply voltage output by the VRM power supply as the load current increases.

A phase-locked Loop (PLL) is also referred to as a loop for locking a phase. It is a typical feedback control circuit, which uses an externally input reference signal to control a frequency and a phase of an internal oscillation signal in a loop to realize automatic tracking of an output signal frequency to an input signal frequency. It is usually used in a closed-loop tracking circuit.

A digital to analog converter (DAC) is a device that converts a digital signal into an analog signal (in a form of a current, a voltage, or a charge).

A power management bus (PMBus) is a bus that supports an open standard digital power management protocol. The open standard digital power management protocol facilitates communication with a power converter or another device by defining transmission and physical interfaces and a command language.

To facilitate clear description of the technical solutions in the embodiments of this application, terms such as "first" and "second" are used in the embodiments of this application to distinguish between same items or similar items that provide basically same functions or purposes. For example, a first threshold and a second threshold are merely used to distinguish between different thresholds, and a sequence thereof is not limited. A person skilled in the art may understand that the terms such as "first" and "second" do not limit a quantity or an execution sequence, and the terms such as "first" and "second" do not mean being definitely different.

It should be noted that, in this application, the term "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the term "exemplary" or "example" or the like is intended to present a relative concept in a specific manner.

In this application, "at least one" refers to one or more, and "a plurality of" refers to two or more. The term "and/or" describes an association relationship between associated objects and indicates that there may be three relationships. For example, A and/or B may represent the following three cases: Only A exists, both A and B exist, and only B exists. A and B may be single or plural. The character "/" generally indicates an "or" relationship between associated objects. "At least one of the following items" or a similar expression means any combination of these items, including a single item or any combination of a plurality of items. For example, at least one of a, b, or c may represent a combination of a and b, a combination of a and c, a combination of b and c, or a combination of a, b, and c, where a, b, and c may be in a singular or plural form.

The method provided in the embodiments of this application is applied to an electronic device. The electronic device may be applied to a terminal or a communications device. The terminal may be one of various terminal devices such as an in-vehicle terminal, a mobile phone, a computer, or a server. The communications device may be one of various communications devices such as a base station or a satellite.

FIG. 1 is a schematic structural diagram of an electronic device according to an embodiment of this application. As shown in FIG. 1, an electronic device 100 includes a processor 101, a power supply 102, and a storage medium 103. The processor 101 and the power supply 102 may be integrated together, or may exist separately. The processor 101 may cover various general-purpose processors of a terminal and a data center device, or certainly may be an in-vehicle processor, but is not limited thereto. The processor 101 may include one or more CPUs. The storage medium 103 is coupled to the processor, and may store a computer executable instruction and data for executing the solution in this application, and the execution is controlled by the processor 101. The processor 101 is configured to execute the computer executable instruction stored in the storage medium, to implement a method provided in the following embodiment of this application. Optionally, the computer executable instruction in this embodiment of this application may also be referred to as application program code. This is not specifically limited in this embodiment of this application.

As shown in FIG. 1, the storage medium 103 may exist independently of the processor 101, or may be built into the processor 101. For example, the storage medium 103 may be a built-in memory in the processor 101, or may be a BIOS memory on a mainboard.

As shown in FIG. 1, the foregoing processor 101 may be a central processing unit (CPU), a general-purpose processor, a digital signal processor (DSP), an ASIC, a field-programmable gate array (FPGA) or another programmable logic device, a discrete gate or transistor logic device, or a discrete hardware component. The memory may include a random access memory (RAM) or may include a non-volatile memory (non-volatile memory), such as a magnetic disk storage or a flash memory (Flash), which is not enumerated one by one. Specifically, the memory may be an external memory such as a memory on a mainboard (such as a BIOS memory), or may be a built-in memory of the processor. For example, when the processor 101 is a CPU, the storage medium 103 may be a built-in memory in the CPU.

As shown in FIG. 1, the foregoing storage medium 103 may be a random access memory (RAM), a flash memory, a read-only memory (ROM), an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art.

Figure 2:
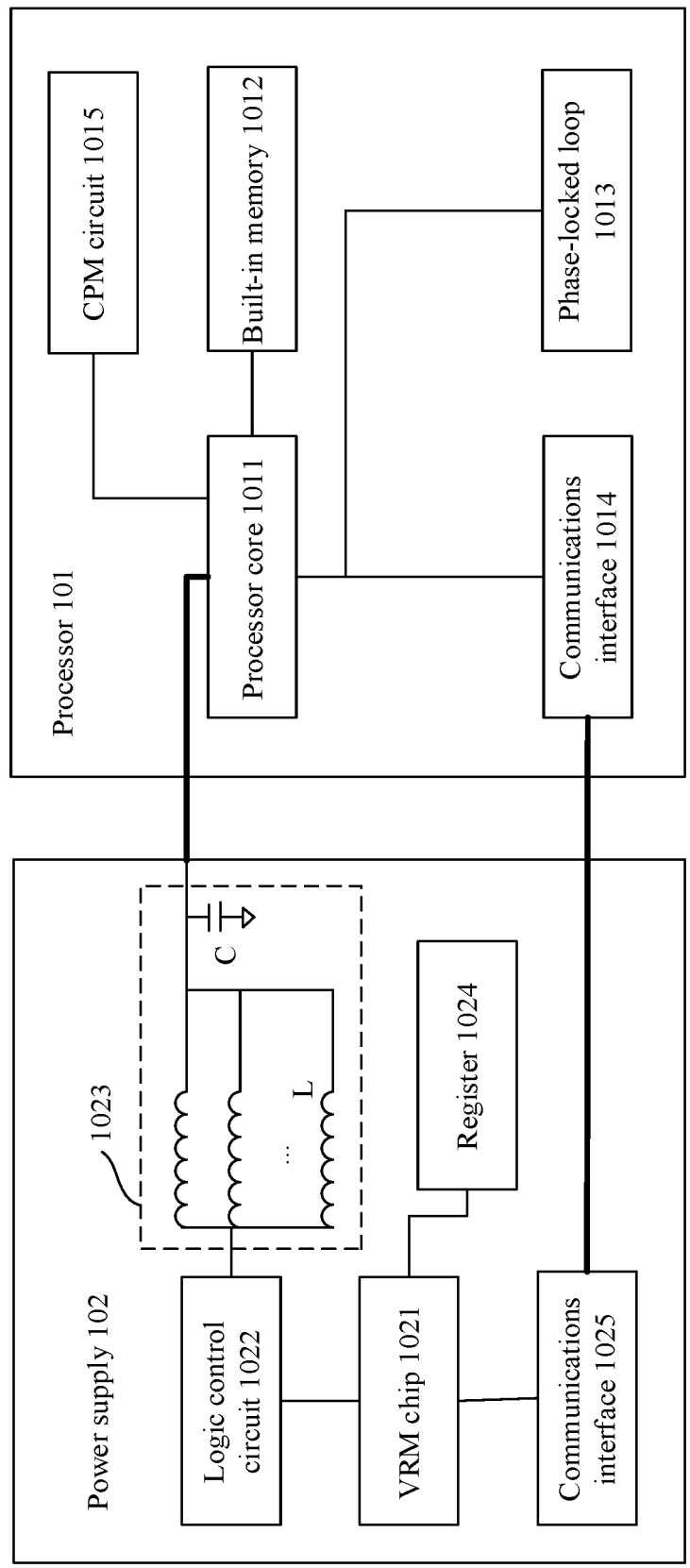
FIG. 2 is a schematic structural diagram of a connection between a processor and a power supply according to an embodiment of this application.

FIG. 2 is a schematic structural diagram of a connection between a processor and a power supply according to an embodiment of this application. As shown in FIG. 2, a processor 101 includes a processor core 1011 and a phase-locked loop 1013. The phase-locked loop 1013 scales or sets an operating frequency of the processor under control of the processor core 1011. In addition, when the processor 101 further includes a built-in memory 1012, the built-in memory 1012 may implement a function of the storage medium 103, so that unnecessary hardware in an electronic device can be reduced, and an integration degree of the electronic device is relatively high.

In an example, as shown in FIG. 2, the processor 101 further includes a CPM circuit 1015, and the CPM circuit 1015 is electrically connected to the processor core 1011.

The power supply 102 shown in FIG. 1 may be various power supplies that have a voltage scaling function and may provide a supply voltage to the processor 101. The power supply 102 shown in FIG. 2 is a schematic structural diagram in which a VRM power supply is used as an example. As shown in FIG. 2, the power supply 102 includes a VRM chip 1021, a logic control circuit 1022, and a buck converter 1023. The VRM chip 1021 is connected to a signal input terminal of the logic control circuit 1022, and a signal output terminal of the logic control circuit 1022 is electrically connected to the buck converter 1023, so that the VRM chip 1021 provides a signal that carries information to the logic control circuit 1022. Certainly, the power supply 102 may further include a register 1024 or another component that has a storage function, which may store information for fetching by the VRM chip 1021. In some cases, the buck converter 1023 may also be independent of the power supply 102, and is disposed between the power supply 102 and the processor 101.

For example, as shown in FIG. 2, the buck converter 1023 includes a grounded capacitor C and a plurality of parallel inductors L, where a first terminal of each of the plurality of parallel inductors L is connected to the signal output terminal of the logic control circuit 1022, and a second terminal of each of the plurality of parallel inductors L is further grounded by using the grounded capacitor C. It can be learned that a connection relationship of the buck converter 1023 is a multi-channel interleaved parallel quasisquare-wave (QSW) topology, and has a good mutual cancellation effect of ripples, and a larger quantity of parallel inductors leads to a better mutual cancellation effect of ripples. A quantity of parallel inductors L is set based on an actual requirement. However, there are at least two inductors L. For example, there are four parallel inductors in the buck converter 1023. In this case, only when a duty cycle of the multi-channel interleaved parallel QSW topology is 0.25, 0.5, or 0.75, ripples of a supply voltage output by the power supply 102 can be completely canceled. If the duty cycle is not equal to the above value, mutual cancellation of only some ripples can be implemented.

As shown in FIG. 2, the processor 101 may communicate with the power supply 102. In an actual application, the processor 101 includes a communications interface 1014. The power supply 102 includes a communications interface 1025, configured to implement communication between the processor 101 and the power supply 102. For example, the processor 101 is connected to the power supply 102 by using a bus or an electrical power cable. The bus may be a power management bus (PMBus), or an I2C (Inter-Integrated Circuit) bus. For example, the processor 101 communicates with the power supply 102 by using the PMBus bus. In this case, both the communications interface of the processor 101 and the communications interface of the power supply 102 are PMBus interfaces.

The method provided in the embodiment of this application may be performed by using any general-purpose processor, any dedicated circuit (ASIC), or the like. The following describes an application scenario in which an in-vehicle processor is applied to a vehicle. The following description is intended for understanding only, and is not intended to be restrictive.

Figure 3:
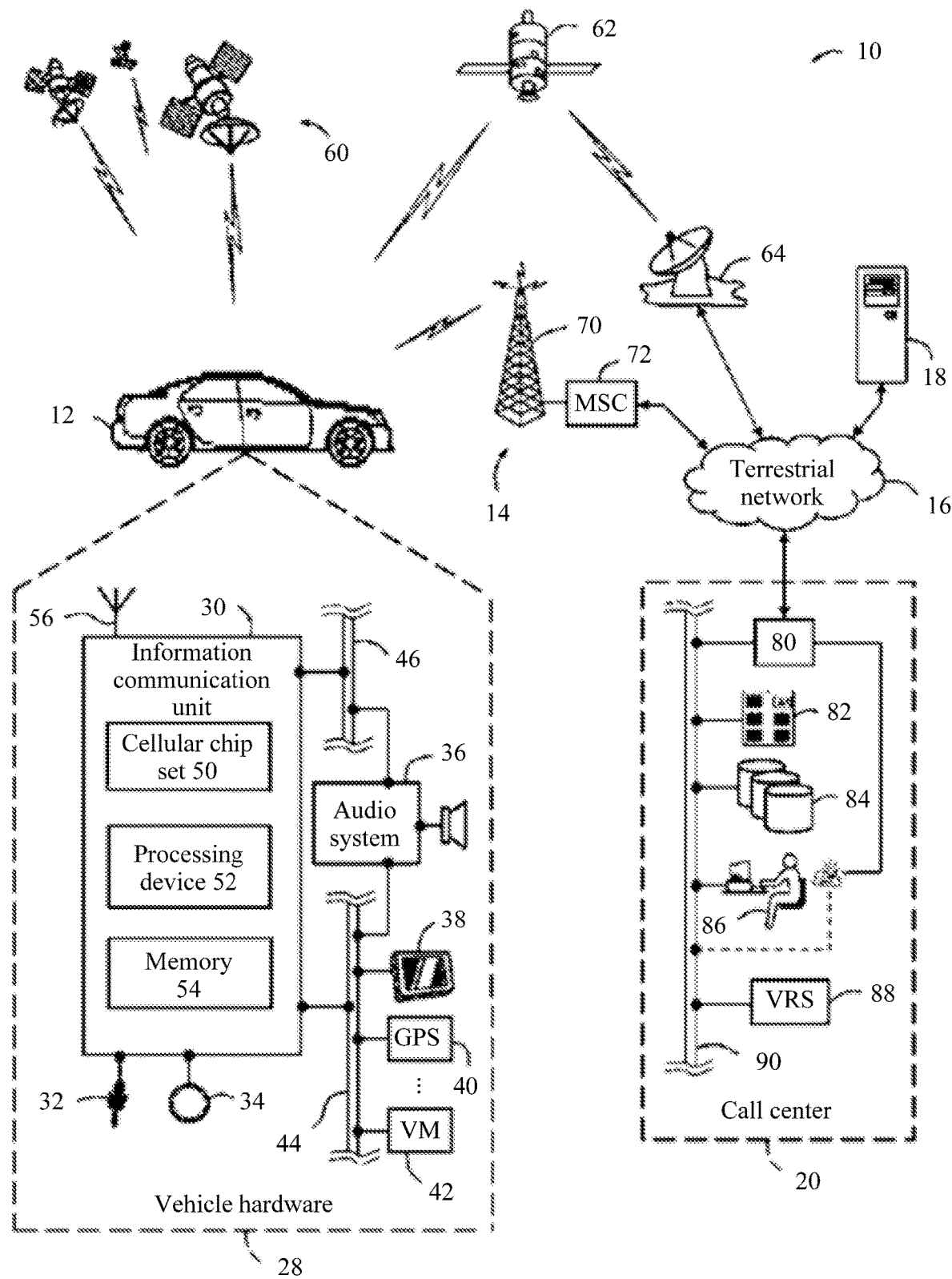
FIG. 3 is a system architecture diagram of a vehicle communications system according to an embodiment of this application.

FIG. 3 is a system architecture diagram of a vehicle communications system according to an embodiment of this application. In FIG. 3, similar symbols identify similar components unless otherwise stated in a context. Illustrative system and method embodiments described in this specification are not intended to be restrictive. It may be easy to understand that some aspects of the disclosed system and method may be arranged and combined based on a plurality of different configurations. All of these are conceived in this specification.

As shown in FIG. 3, a vehicle communications system 10 includes a vehicle 12, one or more wireless carrier systems 14, a terrestrial communications network 16, a computer 18, and a call center 20. It should be understood that a disclosed method can be used together with any quantity of different systems, and is not specifically limited to an operating environment shown herein. Likewise, an architecture, construction, a setting, and an operation of the communications system 10 and individual components of the communications system 10 are usually known in the prior approaches. Therefore, the following paragraphs simply provide only an overview of an example of the communications system 10. The disclosed method can also be used in another system that is not shown in this specification.

The vehicle 12 may be an unmanned vehicle, or may be a manned vehicle. The vehicle 12 may be implemented in a car or may be in a form of a car. However, the example system may alternatively be implemented on another vehicle or be in a form of another vehicle, for example, another vehicle such as a sedan, a truck, a motorcycle, a bus, a ship, an airplane, a helicopter, a lawnmower, a snowplow, a utility vehicle, an amusement ride, agricultural equipment, construction equipment, a tram, a golf cart, a train, and a trolley. In addition, a robotic apparatus may alternatively be configured to perform the method and the system described in this specification.

Some vehicle hardware 28 is shown in FIG. 3. The vehicle hardware 28 includes an information communication unit 30, a microphone 32, one or more buttons, or another control input 34, an audio system 36, a visual display 38, a Global Positioning System (GPS) module 40, and a plurality of VM modules 42 (Vehicle Security Module, which is abbreviated herein as VM for distinction from the foregoing VSM power supply). Some of these devices can be directly connected to the information communication unit, for example, the microphone 32 and the button. Other devices are indirectly connected to the information communication unit by using one or more network connections, for example, a communications bus 44 or an entertainment bus 46. An instance of a suitable network connection includes a controller area network (CAN), media oriented systems transport (MOST), a local interconnected network ( ) a local area network (LAN), and another suitable connection, such as Ethernet or another connection that conforms to known International Organization for Standardization (ISO), Society of Automotive Engineers (SAE), and Institute of Electrical and Electronics Engineers (IEEE) standards and specifications. Only a small part is enumerated herein.

As shown in FIG. 3, the information communication unit 30 is installed in the vehicle, and can perform wireless voice and/or data communication in the wireless carrier system 14 through wireless networking, so that the vehicle can communicate with the call center 20, another information communication-enabled vehicle, or some other entities or devices. The information communication unit preferably establishes a communications channel (a voice channel and/or a data channel) with the wireless carrier system 14 through radio broadcasting, so that voice and/or data transmission can be sent and received on the channel. By providing voice and data communication, the information communication unit 30 enables the vehicle to provide a plurality of different services, which include those services associated with navigation, calls, emergency assistance, diagnosis, infotainment, and the like. Data can be sent by using a data connection (for example, by using packet data transmission on a data channel, or by using a voice channel using a known technology). For a combined service that includes both voice communication (for example, with a live advisor or a voice response unit at the call center 20) and data communication (for example, providing GPS location data or vehicle diagnostic data for the call center 20), the system may perform a switchover between voice transmission and data transmission on the voice channel based on a requirement by using a single call on the voice channel. This may be completed by using a technology known to persons skilled in the art. In addition, data (for example, a Packet Data Protocol (PDP)) may be sent and received by using a short message service SMS. The information communication unit may be configured to be mobile terminated and/or initiated, or may be configured to be application terminated and/or initiated.

The information communication unit 30 uses cellular communication based on a Global System for Mobile Communications (GSM) or a Code Division Multiple Access (CDMA) standard, and therefore, includes a cellular chip set 50 (standard cellular chip set) for voice communication (for example, a hands-free call), a wireless modem for data transmission, a processing device 52, one or more digital memories 54, and dual antennas 56. It should be understood that the modem can be implemented by using software stored in the information communication unit and executed by the processing device 52, or it can be a hardware component inside or separate hardware component outside the information communication unit 30. The modem can operate by using any quantity of different standards or protocols (such as EVDO (CDMA2000 1×EV-DO, EVDO), CDMA, General Packet Radio Service (GPRS), and Enhanced Data Rate for GSM Evolution (EDGE). Wireless networking between the vehicle and another networked device can also be performed by using the information communication unit 30. For this purpose, the information communication unit 30 can be configured to perform wireless communication based on one or more wireless protocols (such as any one of the IEEE 802.11 protocol, Worldwide Interoperability for Microwave Access (WiMAX), or Bluetooth). When the information communication unit is configured to perform packet switched data communication such as Transmission Control Protocol/Internet Protocol (TCP/IP) communication, the information communication unit can be configured with a static IP address, or can be configured to automatically receive an assigned IP address from another device (such as a router) in a network or from a network address server.

The processing device 52 is an in-vehicle processor. The processing device 52 may be any type of device that can process an electronic instruction, including a microprocessor, a microcontroller, a main processor, a controller, a vehicle communication processor, and an Application Specific Integrated Circuit (ASIC). The processing device 52 can be a dedicated processor that is used only in the information communication unit 30 or that can be shared with another vehicle system. The processing device 52 executes various types of digitally-stored instructions, such as software or firmware programs stored in the memory 54, to enable the information communication unit to provide a relatively wide variety of services. Specifically, the processing device 52 can execute a program or process data, so as to execute at least a part of the method discussed in this specification. The processing device 52 may be an electronic device to which the method in this application is applied.

The information communication unit 30 can be configured to provide vehicle services in different ranges, including wireless communication with another part of the vehicle. Such services include: turn-by-turn direct 1 ns and another navigation-associated service provided in conjunction with a GPS-based vehicle navigation module 40; an airbag deployment notification and another emergency or roadside rescue-associated service provided in conjunction with one or more crash sensor interface modules (for example, a main control module (not shown)); a diagnostic report using one or more diagnostic modules; and an infotainment-associated service, where music, a web page, a movie, a television program, a video game, and/or other information are downloaded by an infotainment module and stored for current or later playback. The services listed above are by no means an exhaustive list of all capabilities of the information communication unit 30, but are only an enumeration of some services that the information communication unit can provide. In addition, it should be understood that at least some of the foregoing modules can be implemented in a form of a software instruction stored inside or outside the information communication unit 30. The modules may be hardware components located inside or outside the information communication unit 30; or the modules may be integrated into and/or shared with each other, or integrated into and/or shared with another system located in the entire vehicle. Only several possibilities are enumerated herein. When the VM module 42 located outside the information communication unit 30 operates, the VM module 42 may exchange data and a command with the information communication unit 30 by using the vehicle bus 44.

The GPS module 40 receives a radio signal from a GPS satellite 60. The GPS module 40 can determine a location of the vehicle from the signal. The location of the vehicle is used to provide a vehicle driver with a navigation service and another location-related service. Navigation information can be presented on the display 38 (or another display in the vehicle) or can be presented verbally, for example, when turn-by-turn navigation is provided. The navigation service can be provided by using a dedicated navigation module (which may be a part of the GPS module 40) in the vehicle, or some or all navigation services may be completed by using the information communication unit 30. Location information is sent to a remote location, to provide the vehicle with a navigation map, a map annotation (a point of interest, a restaurant, and the like), route calculation, and the like. The location information can be provided for the call center 20 or another remote computer system such as the computer 18 for another purpose, such as fleet management. In addition, new or updated map data can be downloaded from the call center 20 to the GPS module 40 by using the information communication unit 30.

In addition to the audio system 36 and the GPS module 40, the vehicle 12 can include another vehicle safety module in a form of an electronic hardware component, that is, the VM module 42. The VM module 42 is located in the entire vehicle and usually receives inputs from one or more sensors, and performs diagnostic, monitoring, control, reporting, and/or another function by using sensed inputs. Each VM module 42 is preferably connected to another VM module 42 by using the communications bus 44, is also connected to the information communication unit 30, and can be programmed to run a vehicle system and subsystem diagnostic test. For example, one VM module 42 can be an Engine Control Module (ECM) that controls various aspects (such as fuel ignition and an ignition time point) of an engine operation. Another VM module 42 can be a powertrain system control module that regulates an operation of one or more components of a powertrain system in the vehicle, and the another VM module 42 can be a main control module that manages various electronic components (such as an electrical door lock and a headlight of the vehicle) located in the entire vehicle. According to an embodiment, the engine control module is equipped with an On Board Diagnostics (OBD) feature, and the on board diagnostics feature provides a large quantity of real-time data, such as data received from various sensors (including a vehicle emission sensor), and provides a standardized series of diagnostic fault code. The diagnostic fault code allows a person skilled in the art to quickly identify and repair a fault in the vehicle. As understood by a person skilled in the art, the foregoing VM modules are merely examples of some modules that may be used in the vehicle 12, and many other modules are also possible.

The vehicle electronic components 28 further include a plurality of vehicle user interfaces, to provide an apparatus for providing and/or receiving information for a vehicle occupant, including the microphone 32, the button, the audio system 36, and the visual display 38. As used in this specification, the term "vehicle user interface" broadly includes an electronic device in any suitable form, and the electronic device includes a hardware component and a software component. The electronic device is located in the vehicle, and enables a vehicle user to communicate with a vehicle component or perform communication by using a vehicle component. The microphone 32 provides an audio input to the information communication unit, to enable the driver or another vehicle occupant to provide a voice command and make a hands-free call by using the wireless carrier system 14. For this purpose, the microphone 32 can be connected to an onboard automated voice processing unit, and the onboard automated voice processing unit uses an Human Machine Interface (HMI) technology known in prior approaches. The button allows a manual user input into the information communication unit 30, to initiate a radiotelephone call and provide another data, response, or control input. A separate button can be used to initiate an emergency call and a regular service help call to the call center 20. The audio system 36 provides an audio output to the vehicle occupant, and can be a dedicated stand-alone system or a part of a primary vehicle audio system. According to a specific embodiment shown herein, the audio system 36 is operatively connected to the vehicle bus 44 and the entertainment bus 46, and can provide Amplitude Modulation (AM), Frequency Modulation (FM) and satellite broadcasting, Digital Versatile Disc (DVD), and another multimedia function. The function can be provided in combination with the foregoing infotainment module or provided independently. The visual display 38 is preferably a graphics display, such as a touchscreen on a dash board or a head-up display reflected from a windshield, and can be configured to provide a plurality of input and output functions. Various other vehicle user interfaces can also be used because the interface in FIG. 3 is only an example in a specific embodiment solution.

The wireless carrier system 14 is preferably a cellular telephone system, including a plurality of cellular towers 70 (only one cellular tower is shown), one or more Mobile Switching Centers (MSCs) 72, and any other networking component required for connecting the wireless carrier system 14 to the terrestrial network 16. Each cellular tower 70 includes a transmit antenna, a receive antenna, and a base station. Base stations from different cellular towers are directly connected to the MSC 72 or connected to the MSC 72 by using an intermediate apparatus (such as a base station controller). The wireless carrier system 14 may implement any suitable communications technology, including, for example, an analog technology (such as an Advanced Mobile Phone System (AMPS)) or an updated digital technology (such as CDMA (for example, CDMA2000) or GSM/GPRS). A person skilled in the art will understand that various cellular tower/base station/MSC settings are possible and may be used together with the wireless carrier system 14. For example, a base station and a cellular tower can be located at a same location, or a base station and a cellular tower can be located at locations remote from each other. Each base station can respond to a single cellular tower, or a single base station can serve all cellular towers. All base stations can be connected to a single MSC. Only a small part of possible settings is enumerated herein.

In addition to the wireless carrier system 14, different wireless carrier systems in a form of satellite communication can be used to provide unidirectional or bidirectional communication with the vehicle. This can be completed by using one or more communications satellites 62 and an uplink transmission station 64. Unidirectional communication can be, for example, a satellite broadcasting service. The transmission station 64 receives content of a program (news, music, or the like), packages the content for uploading, and then sends the content to the satellite 62. The satellite 62 broadcasts the program to a user. Bidirectional communication can be, for example, a satellite telephony service in which telephone communication is relayed between the vehicle 12 and the station 64 by using the satellite 62. If the satellite 62 is used, this satellite telephony can be added to the wireless carrier system 14 or replace the wireless carrier system 14 for use.

The terrestrial network 16 may be a conventional terrestrial radio communications network. The terrestrial network 16 is connected to one or more fixed-line phones, and connects the wireless carrier system 14 to the call center 20. For example, the terrestrial network 16 may include a Public Switched Telephone Network (PSTN), such as a PSTN used to provide wired telephony, packet switched data communication, and an Internet infrastructure. One or more parts of the terrestrial network 16 can be implemented by using a standard wired network, an optical fiber or another optical network, a cable network, an electrical power cable, another wireless network (such as a Wireless Local Area Networks (WLAN)), a network that provides Broadband Wireless Access (BWA), or any combination thereof. The terrestrial network 16 may further include one or more Short Message Service Center (SMSCs) used to store, upload, convert, and/or transmit an Short Message Service (SMS) between a sender and a receiver. For example, the SMSC may receive an SMS message from the call center 20 or a content provider (such as an external short message entity or an ESME), and the SMSC may transmit the SMS message to the vehicle 12 (such as a mobile terminal device). The SMSC and a function of the SMSC are known to skilled persons. In addition, the call center 20 does not need to be connected by using the terrestrial network 16, but may include a wireless telephone device, so that the call center 20 can directly communicate with a wireless network (such as the wireless carrier system 14).

The computer 18 can be one of a plurality of computers. The plurality of computers can be accessed by using a private or public network (such as the Internet). Each such computer 18 can be used for one or more purposes, for example, the vehicle may access a web server by using the information communication unit 30 and the wireless carrier system 14. Another such accessible computer 18 can be, for example, a service center computer in which diagnostic information and other vehicle data can be uploaded from the vehicle by using the information communication unit 30; a client computer used by a vehicle owner or another user for the following purposes such as accessing or receiving vehicle data, or setting or configuring a user parameter, or controlling a vehicle function; or a third-party repository. Vehicle data or other information is provided to or is from the third-party repository by communicating with either the vehicle 12 or the call center 20 or by communicating with both the vehicle 12 and the call center 20. The computer 18 can also be configured to provide an Internet connection, such as a Domain Name Server (DNS) service; or be used as a network address server that assigns an IP address to the vehicle 12 by using a Dynamic host configuration protocol (DHCP) or another suitable protocol.

The call center 20 is designed to provide a plurality of different system backend functions for the vehicle electronic components 28. In addition, based on the example embodiment shown herein, the call center 20 usually includes one or more switches 80, servers 82, databases 84, live advisors 86, and VRSs (e.g., Automatic voice response system) 88, and they are all known in prior approaches. These call center components are preferably connected to each other by using a wired or wireless local area network 90. The switch 80 can be a Private branch exchange (PBX), and route an incoming signal, so that voice transmission is usually sent to the live advisor 86 by using an ordinary telephone or sent to the automatic voice response system 88 by using VoIP. A live advisor telephone can also use Voice over Internet Protocol (VoIP) indicated by a dashed line in FIG. 3. VoIP and other data communication passing through the switch 80 are implemented by using a modem (not shown in the figure) connected between the switch 80 and the network 90. Data transmission is transferred to the server 82 and/or the database 84 by using the modem. The database 84 can store account information such as user identity authentication information, a vehicle identifier, a data profile record, a behavior pattern, and other related user information. Alternatively, data transmission may be performed by a wireless system, such as 802.11x and a GPRS. In addition, the short message service (SMS) may be used to send and/or receive data (such as a PDP), and the call center 20 may be configured to be mobile terminated and/or initiated, or may be configured to be application terminated and/or initiated. Although the illustrated embodiment is described as that the embodiment is used together with the manned call center 20 using the live advisor 86, it is to be understood that the call center may alternatively use the VRS 88 as an automatic advisor, or a combination of the VRS 88 and the live advisor 86 may be used.

Currently, for an unmanned vehicle, a processing device is required to have a high computing power and high reliability. An in-vehicle environment temperature of the unmanned vehicle is high (for example, an internal environment temperature of a vehicle center console may be up to 85 degrees). In addition, due to heating from a high computing power and high power consumption of an automated driving processor, a temperature of a processor core rapidly increases, which limits further improvements to the computing power of the processor. To ensure that the core temperature of the processor in the processing device is not too high during operation with a high computing power, in addition to improving a capability of a cooling system, power consumption of the processor needs to be effectively reduced by using a power consumption reduction technology. A related technology can only reduce power consumption in a case of a low load amount of the processor. When the processor has a relatively high load amount, to ensure a processing speed of the processor, it is still difficult to reduce power consumption of the processor. Therefore, in a related technology, a chip integration degree of the processor cannot be further improved, further application of the Turbo technology in the processor is limited, and performance of the processor cannot be further improved. In addition, when the processor has a relatively high load amount, a large quantity of heat is generated when the processor operates, and the cooling system needs to cool the processor, which further increases cooling costs of the processor. For example, when energy consumption of a data center increases, a cooling system with relatively high cooling performance needs to be equipped to cool the data center. For another example, because energy consumption is relatively high, a standby time of a terminal device is reduced, and the terminal device cannot operate for a long time.

To resolve the foregoing problem, an embodiment of this application provides a voltage scaling method. In the method provided in the embodiment of this application, operations performed by a processor may alternatively be performed by a chip applied to the processor, and operations performed by a power supply may alternatively be performed by a chip applied to the power supply. In the following embodiment, for example, the processor and the power supply are separately used as execution bodies.

Figure 4:
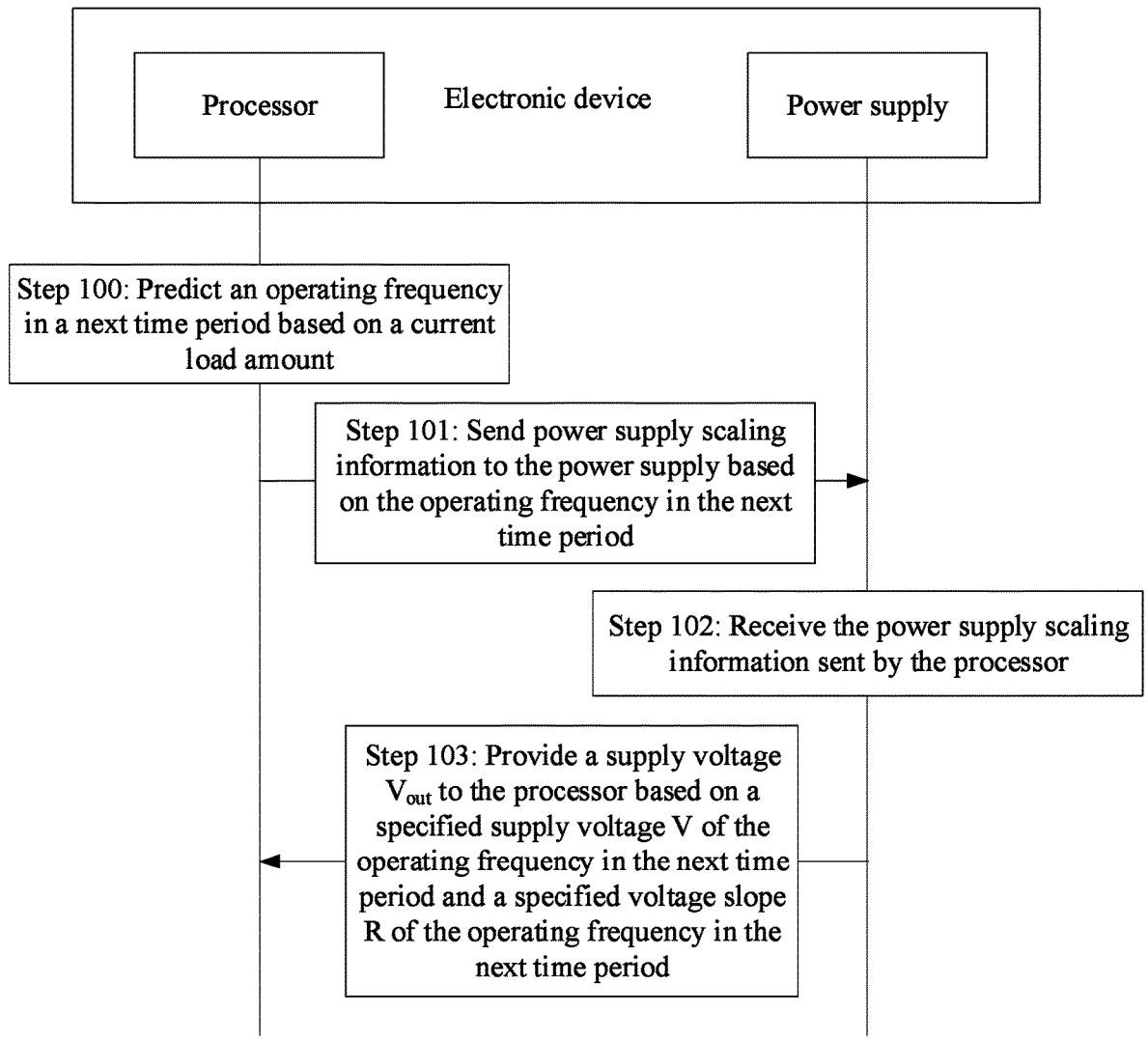
FIG. 4 is a schematic flowchart 1 of a voltage scaling method according to an embodiment of this application.

FIG. 4 is a schematic flowchart of a voltage scaling method according to an embodiment of this application. As shown in FIG. 4, an embodiment of this application provides a voltage scaling method. The method is applied to an electronic device having a processor and a power supply. The power supply may supply power to the processor. The method includes the following operations.

Operation 101: The processor sends power supply scaling information to the power supply based on an operating frequency in a next time period. The power supply scaling information includes a specified supply voltage V of the operating frequency in the next time period, which is defined as a specified supply voltage determined by the processor based on the operating frequency in the next time period when the processor operates at a specific operating frequency. Generally, only the DVFS technology may be used for determining the specified supply voltage. That is, based on the operating frequency in the next time period, a correspondence between an operating frequency and a specified supply voltage that are of the processor is searched for the specified supply voltage corresponding to the operating frequency in the next time period.

A value of duration of the next time period may be determined in a unit of minute based on an actual situation. For example, the duration of the next time period is 10 ms to 50 ms. For example, the duration of the next time period is 50 ms. In actual application, the operating frequency in the next time period refers to an operating frequency predicted based on a current operating frequency. That is, before operation 101, operation 100 should be further included: The processor predicts the operating frequency in the next time period based on a current load amount.

For example, the processor collects the current load amount in real time, predicts a load amount in the next time period based on the collected current load amount, and determines the operating frequency in the next time period based on the load amount in the next time period. The current load amount may be a processor occupancy rate, an application program execution amount, a task amount, or the like.

For example, a correspondence table between a load amount and an operating frequency is stored in a built-in memory of a mainboard or the processor. In the correspondence table between a load amount and an operating frequency, a same operating frequency may be set to correspond to load amounts within an interval. In this case, a load amount interval of the predicted load amount in the next time period is first determined from the correspondence table between a load amount and an operating frequency based on the predicted load amount in the next time period, and then the operating frequency in the next time period is determined based on the load amount interval.

For another example, the built-in memory of the mainboard or the processor stores operating frequency switching information. A preset operating frequency is determined based on the predicted load amount in the next time period, and the operating frequency switching information is searched for the operating frequency in the next time period based on the preset operating frequency. In actual application, the operating frequency switching information includes a plurality of operating frequencies, and a smallest operating frequency is selected from one or more operating frequencies that are greater than the preset operating frequency as the operating frequency in the next time period. For example, the operating frequency switching information includes a plurality of frequencies: 1.0 GHz, 1.5 GHz, and 2.0 GHz. If the operating frequency in the next time period is 1.3 GHz, it indicates that the operating frequency in the next time period should be switched to 1.5 GHz. If the operating frequency in the next time period is 1.7 GHz, it indicates that the operating frequency in the next time period should be switched to 2.0 GHz.

Operation 102: The power supply receives the power supply scaling information sent by the processor. For example, if the processor communicates with the power supply by using a PMBus bus, the power supply receives the power supply scaling information by using a PMBus interface.

Operation 103: The power supply provides a supply voltage $V_{out}$ to the processor based on the specified supply voltage V of the operating frequency in the next time period and a specified voltage slope R of the operating frequency in the next time period. The voltage slope herein refers to a decrease speed of the supply voltage $V_{out}$ as a load current of the power supply increases, which is also referred to as a loadline value, and is in a unit of a dimension of resistance.

The supply voltage $V_{out}$ decreases as the load current of the power supply increases. $V_{min} \leq V_{out} \leq V$, where $V_{min}$ is a lowest supply voltage for normal operation of the processor as the load current increases when the processor operates at the operating frequency in the next time period. For example, $V_{min}$ refers to a lowest supply voltage provided by the power supply to the processor when the load current increases to a maximum value, and the lowest supply voltage may enable the processor to operate normally.

To cooperate with supply voltage scaling, the method further includes: When determining that the operating frequency in the next time period is not equal to the current operating frequency, the processor sets the current operating frequency to be equal to the operating frequency in the next time period. The operating frequency of the processor is essentially a product of an external frequency and a frequency multiplier. For example, an external frequency of a CPU is 100 MHz, a frequency multiplier is 8.5, and an operating frequency of the CPU=the external frequency x the frequency multiplier=100 MHz×8.5=850 MHz. It can be learned that the frequency multiplier or the external frequency of the processor may be changed to scale the operating frequency of the processor. In addition, a manner of scaling the operating frequency of the processor should also be determined with reference to a model of the processor. For example, if the processor is an Intel CPU, because the Intel CPU prevents modifying a frequency multiplier, only a manner of modifying an external frequency can be used to modify an operating frequency of the Intel CPU. For another example, a frequency multiplier of a CPU of Advanced Micro Devices, Inc. (AMD for short) may be modified, but improvements to CPU performance by modifying the frequency multiplier is not better than improvements to the CPU performance by modifying an external frequency.

For example, when the operating frequency of the processor is switched, a clock frequency multiplier is scaled by using a PLL inside the processor, so that a current operating frequency of the processor is equal to the operating frequency in the next time period determined by a processor core.

Figure 5:
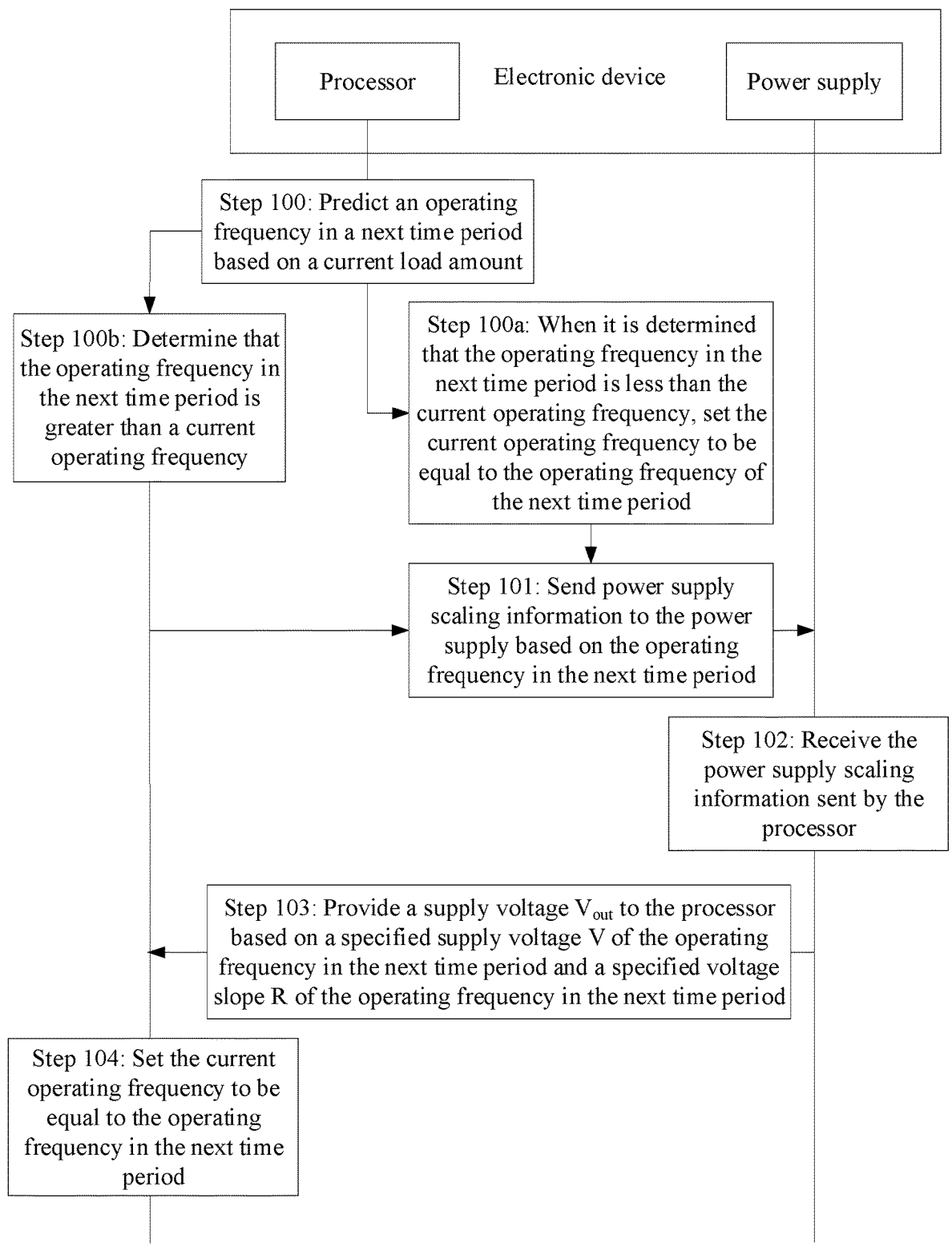
FIG. 5 is a schematic flowchart 2 of a voltage scaling method according to an embodiment of this application.

When the operating frequency of the processor is switched, a switching opportunity of the operating frequency of the processor needs to be determined based on a size relationship between the current operating frequency and the operating frequency in the next time period. As shown in FIG. 5, that when determining that the operating frequency in the next time period is not equal to the current operating frequency, the processor sets the current operating frequency to be equal to the operating frequency in the next time period includes:

Operation 100*a*: When determining that the operating frequency in the next time period is less than the current operating frequency, the processor sets the current operating frequency to be equal to the operating frequency in the next time period, and performs operation 101.

Operation 100*b*: When determining that the operating frequency in the next time period is greater than the current operating frequency, the processor performs operation 101.

When the processor determines that the operating frequency in the next time period is greater than the current operating frequency, after operation 103, the method further includes operation 104: The processor sets the current operating frequency to be equal to the operating frequency in the next time period.

In the method provided in this embodiment of this application, the operating frequency in the next time period is the operating frequency predicted based on the current operating frequency, and the supply voltage $V_{out}$ provided by the power supply to the processor based on the specified supply voltage V of the operating frequency in the next time period and the specified voltage slope R of the operating frequency in the next time period adapts to the operating frequency in the next time period of the processor. In addition, the load current has a feature of periodically increasing from a minimum load current to a maximum load current. Therefore, in prior approaches, when the power supply outputs a load voltage in a constant voltage manner, the load voltage passively decreases in a process in which the load current increases. According to the method provided in this embodiment of this application, the supply voltage $V_{out}$ output by the power supply is actively controlled to decrease as the load current increases, so that when the load current starts to rise, the supply voltage $V_{out}$ output by the power supply actively decreases as the load current increases. In this case, the supply voltage $V_{out}$ is less than the specified supply voltage V of the processor at the operating frequency in the next time period and is greater than or equal to a lowest supply voltage $V_{min}$ for normal operation of the processor when the load current is the maximum and the load current increases when the processor operates at the operating frequency in the next time period. It can be learned that, compared with prior approaches, this embodiment of this application provides the method in which the supply voltage $V_{out}$ provided by the power supply can ensure normal operating of the processor while reducing power consumption of the processor, thereby improving processor performance. In addition, a higher operating frequency of the processor results in a higher load amount of the processor. Therefore, according to the method provided in this embodiment of this application, regardless of the load amount of the processor, when the load current increases, the power supply can supply power to the processor at a voltage lower than a specified supply voltage of the current operating frequency, ensuring that the processor has relatively low power consumption while operating normally.

It can be learned from the foregoing that, compared with using only the DVFS technology to reduce power consumption of the processor, the method provided in this embodiment of this application can ensure that when the processor operates normally, not only power consumption can be reduced when the processor has a light load, but also power consumption can be reduced when the processor has a heavy load, thereby reducing power consumption in all cases, and reducing a heating degree of the processor. In addition, when the processor has a relatively high load amount, the heating degree of the processor is relatively low. Therefore, the operating frequency can be further improved by using the Turbo technology, and an application limitation problem of the Turbo technology caused by a relatively high heating degree of the processor can be alleviated.

In a possible embodiment, a supply voltage output by a VRM power supply has a feature of decreasing linearly as a load current of a loadline increases. The supply voltage $V_{out}=V-I*R$, and I is the load current of the power supply. It can be learned from this formula that, in the method in this embodiment of this application, on the basis that the DVFS technology reduces power consumption in prior approaches, based on the feature that the voltage slope decreases as the load current increases, a supply voltage determined by using the DVFS technology is finely tuned by using a product of the specified voltage slope and the load current, thereby reducing power consumption in all cases.

In addition, the supply voltage $V_{out}$ is determined by the specified voltage slope R of the processor in the next time period, the specified supply voltage V in the next time period, and the load current I. The voltage slope refers to the decrease speed of the supply voltage as the load current of the power supply increases. Therefore, the product of the specified voltage slope R of the operating frequency in the next time period and the load current I is essentially an active decrease amount of the supply voltage when the load current of the power supply increases. Provided that it is ensured that the active decrease amount is greater than or equal to a maximum passive decrease amount of the load voltage when the load current increases in prior approaches, the supply voltage $V_{out}$ can be enabled to be always greater than or equal to a lowest supply voltage $V_{min}$ for normal operation of the processor as the load current increases when the processor operates in the next time period.

When the power supply includes a VRM chip, a logic control circuit, and a buck converter, the VRM chip may determine a reference voltage based on the specified supply voltage V of the operating frequency in the next time period, and determine a voltage slope of the reference voltage based on the specified voltage slope R of the operating frequency in the next time period. The VRM chip transmits the reference voltage and the voltage slope of the reference voltage to the logic control circuit. The logic control circuit outputs a variable voltage based on the reference voltage and the voltage slope of the reference voltage, changes the voltage by using the buck converter, and outputs a supply voltage $V_{out}$ that meets an operating requirement of the processor.

Figure 6:
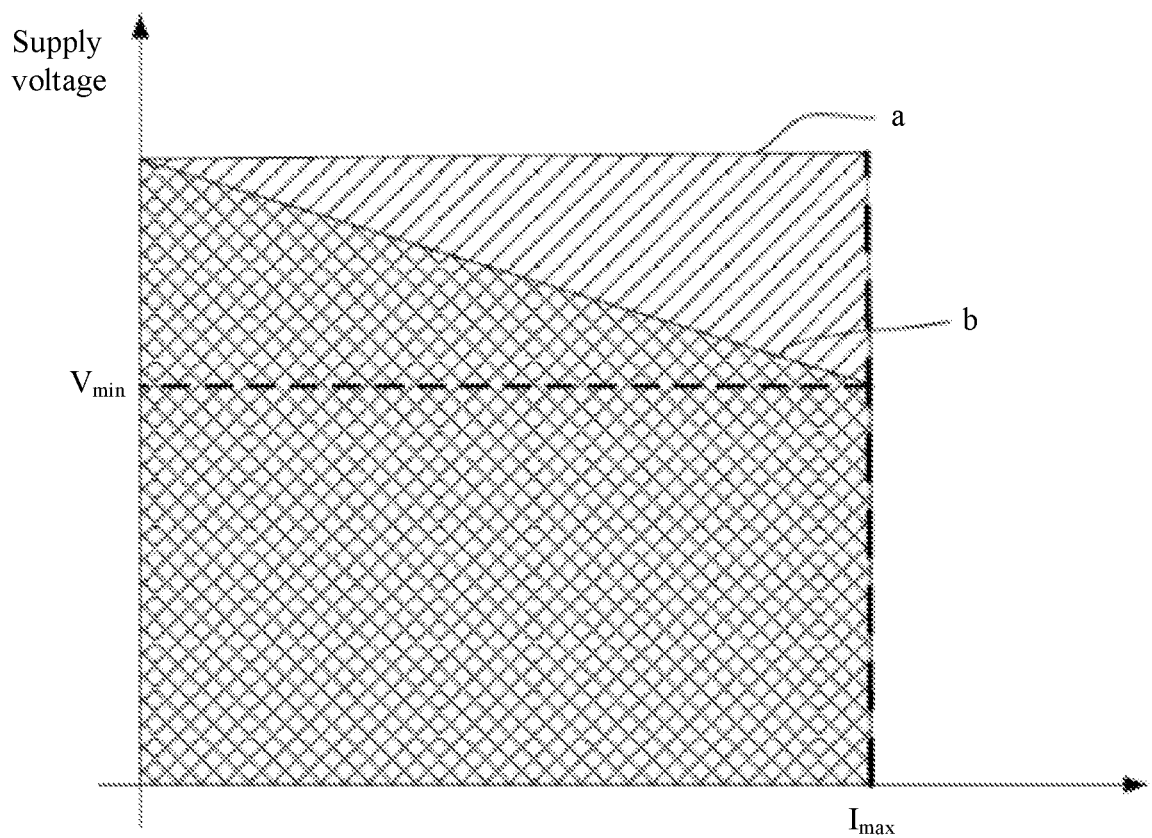
FIG. 6 is a schematic diagram of a transient process of a load of a power supply.
Figure 7:
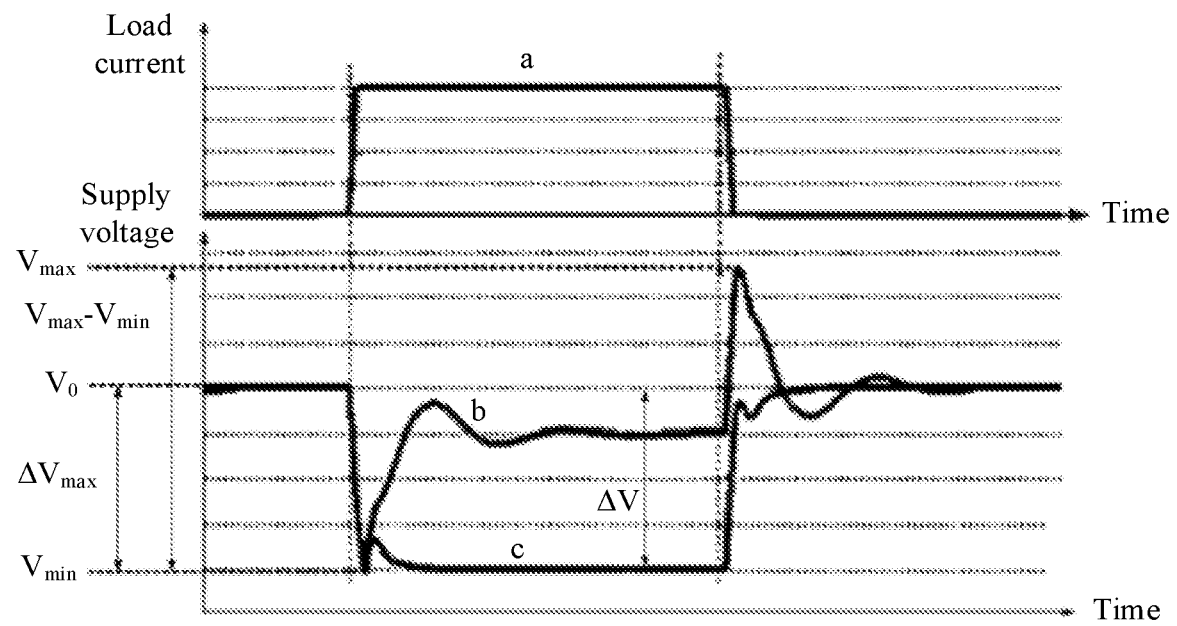
FIG. 7 is a schematic diagram of a loadline feature of a power supply.

FIG. 6 is a schematic diagram of a transient process of a load of a power supply. FIG. 7 is a schematic diagram of a loadline feature of a power supply. In FIG. 6, $V_{min}$ is a lowest supply voltage of the processor. Imax is a maximum value of the load current. With reference to FIG. 6 and FIG. 7, the following analyzes a principle that a supply voltage ensues that the processor operates normally at a relatively low voltage according to the method in this application.

As shown in a straight line a in FIG. 6, when a loadline value=0, it indicates that the power supply provides the supply voltage to the processor in a form of a direct current voltage, and the supply voltage is not to be lowered, that is, a supply voltage $V_0$ does not change with the load current. A curve a in FIG. 7 is a transient curve of the load current. A curve b in FIG. 7 represents a transient response curve of the voltage of the power supply when the loadline value=0. As shown in the curve a and the curve b in FIG. 7, under impact of the load current, the supply voltage provided by the power supply drops passively due to an insufficient capacitance at an output terminal of the buck converter, a drop process lasts from several μs to dozens of μs, and then the supply voltage gradually recovers to a direct current voltage.

Specifically, with reference to the curve a and the curve b in FIG. 7, it may be seen that when the load current is a minimum value, the supply voltage is $V_0$ and remains constant. As the load current rises from the minimum value to the maximum value, the supply voltage passively decreases from $V_0$ to the minimum value $V_{min}$, and then rises gradually. As the load current decreases from the maximum value to the minimum value, the supply voltage rises rapidly to the maximum value $V_{max}$, and then gradually decreases until the supply voltage is equal to $V_0$. In the entire process, a difference between the minimum value and the maximum value of the supply voltage may reach $V_{max}-V_{min}$. In addition, when the supply voltage passively decreases from $V_0$ to the minimum value $V_{min}$, the processor can still operate normally. Therefore, a maximum passive drop voltage of the supply voltage is $\Delta V_{max}=V_0-V_{min}$.

As shown by an oblique line b in FIG. 6, when the loadline value>0, it indicates that the direct current voltage is actively linearly lowered when the load current increases, and the voltage decrease slope is equal to the loadline value. In FIG. 7, c is a transient response curve of the voltage of the power supply when the loadline value>0. As shown in the curve c in FIG. 7, under impact of the load current, the power supply actively controls the supply voltage to decrease. Provided that a decrease amplitude $\Delta V$ of the supply voltage is not less than the maximum passive drop voltage $\Delta V_{max}$ of the curve b, it can be ensured that the processor operates normally. It can be learned that the method provided in this embodiment of this application can ensure that the processor operates normally. If the decrease amplitude $\Delta V$ of the supply voltage is less than the maximum passive drop voltage of the curve b, the processor cannot operate normally.

It can be learned from the foregoing that in the method provided in this embodiment of this application, if it is ensured that when the load current is equal to the minimum value, the supply voltage $V_{out}$ is equal to the specified supply voltage V of the operating frequency in the next time period, and when the load current increases, R*I always remains being less than or equal to a maximum passive drop voltage of the specified supply voltage V of the operating frequency in the next time period, it can be ensured that the supply voltage $V_{out}$ is greater than or equal to the lowest supply voltage of the operating frequency in the next time period.

To verify that the method provided in this embodiment of this application can reduce power consumption of the processor in a case of a heavy load, the following makes analysis with reference to the DVFS technology.

The DVFS technology is short for dynamic voltage and frequency scaling technology, and can reduce power consumption to some extent. It can reduce power consumption by reducing a working voltage and a working frequency of a chip.

The chip is used as an example: A power consumption calculation formula of the chip is $P_{loss}=\alpha \cdot C \cdot V_{cc}^2 \cdot f + V_{cc} \cdot I_{LEAK} \cdot \alpha \cdot C \cdot V_{cc}^2 f$ is dynamic power consumption of the chip $V_{cc} \cdot I_{LEAK}$ is static power consumption of the chip, $V_{cc}$ is the working voltage of the chip, $f$ is the working frequency of the chip, $I_{LEAK}$ is a leakage current of the chip, a is an average toggle rate of a circuit at a current working frequency of the chip, and C is a capacitance of a load capacitor. It should be understood that the power consumption calculation formula of the chip is also applicable to a processor or an integrated circuit that has an information processing function.

It can be learned from the power consumption calculation formula of the chip that: the dynamic power consumption of the chip is in a quadratic relationship with the working voltage $V_{cc}$ of the chip, and the dynamic power consumption is in a linear relationship with the working frequency $f$ of the chip. In addition, when the working voltage $V_{cc}$ of the chip and the working frequency $f$ of the chip are higher, the dynamic power consumption of the chip is also higher. Therefore, in the DVFS technology, power consumption can be reduced by reducing the supply voltage and the working frequency of the chip.

Figure 8:
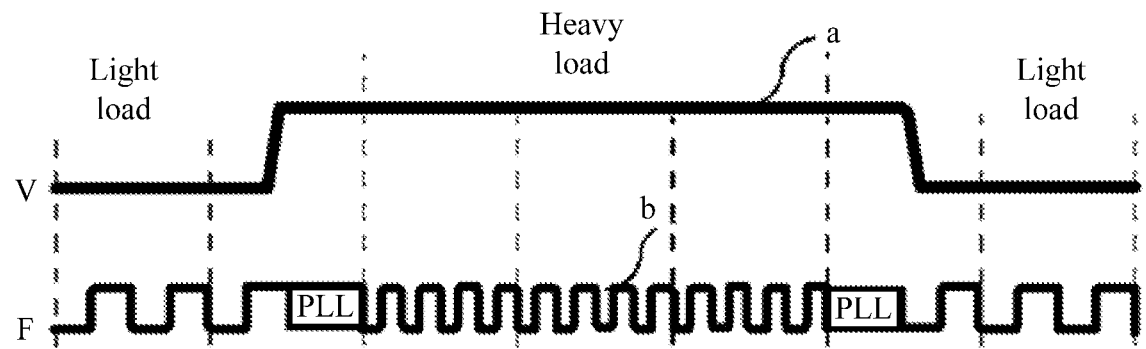
FIG. 8 is a schematic diagram of a mechanism of reducing power consumption by using a DVFS technology.

FIG. 8 is a schematic diagram of a mechanism of reducing power consumption by using a DVFS technology. A time sequence a in FIG. 8 is a time sequence diagram of a voltage, and a time sequence b in FIG. 8 is a time sequence diagram of an operating frequency. As shown in FIG. 8, when the processor has a light load, the operating frequency and the supply voltage of the processor are both relatively low. When the processor has a heavy load, the operating frequency and the supply voltage of the processor are both relatively high, and are of a rated value.

Figure 9:
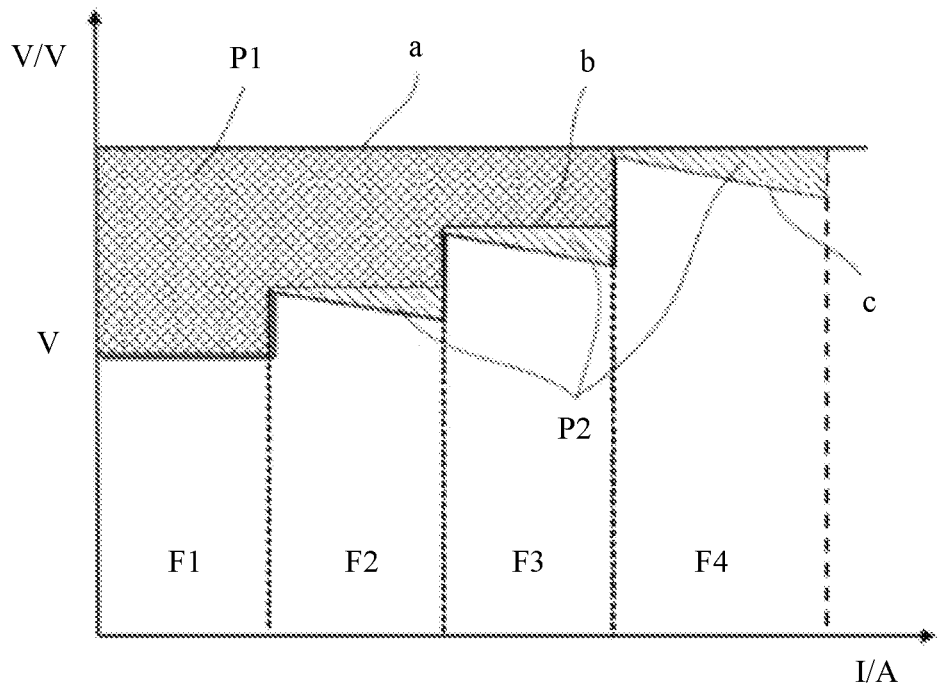
FIG. 9 is a comparison diagram of power supplying of a method in this application, a DVFS technology, and a fixed voltage method.

FIG. 9 is a comparison diagram of power supplying of a method in this application, a DVFS technology, and a fixed voltage method. A horizontal axis indicates a load current (which may be considered as a maximum load current), and a vertical axis indicates a supply voltage. A straight line a in FIG. 9 is a voltage variation diagram of power supplying by using the fixed voltage method. It can be seen from the straight line a that the supply voltage of the processor is a fixed rated supply voltage regardless of the change of the operating frequency of the processor. A fold line b in FIG. 9 is a voltage variation diagram of power supplying by using only the DVFS technology. It can be seen from the fold line b that in a low power mode, an operating frequency of a CPU is F1, and a supply voltage of the CPU is V11. In a rated mode, the operating frequency of the CPU is F2, and the supply voltage of the CPU is V12. In a first overclocking mode, the operating frequency of the CPU is F3, and the supply voltage of the CPU is V13. In a second overclocking mode, the operating frequency of the CPU is F4, and the supply voltage of the CPU is a supply voltage V14. A fold line c in FIG. 9 is a voltage variation diagram of power supplying by using the method in this application. It can be seen from the fold line c that in the low power mode, the operating frequency of the CPU is F1, and the supply voltage of the CPU is V21. In the rated mode, the operating frequency of the CPU is F2, and the supply voltage of the CPU is V22. In the first overclocking mode, the operating frequency of the CPU is F3, and the supply voltage of the CPU is V23. In the second overclocking mode, the operating frequency of the CPU is F4, and the supply voltage of the CPU is V24. It should be understood that, as power consumption increases, the operating frequency of the CPU also increases. Therefore, F1≤F2≤F3≤F4.

It can be seen from FIG. 9 that when only the DVFS technology is used to supply power, V11<V12≤V13≤V14, and the supply voltage of the CPU increases in a stepped manner as the operating frequency and the power consumption of the CPU increase until the supply voltage is equal to the supply voltage V14. A first shadow region P1 in FIG. 9 is a power consumption gain region of the DVFS technology compared with the fixed voltage method. It can be seen that when the operating frequency of the CPU is relatively high, the DVFS technology cannot reduce power consumption of the CPU. It can be seen that the DVFS technology can reduce power consumption when the processor has a relatively light load, but the DVFS technology cannot reduce power consumption when the processor has a relatively heavy load.

When the method in this embodiment of this application is used to supply power, V21≤V22≤V23≤V24. Although the supply voltage of the CPU increases in a stepped manner as the operating frequency and the power consumption increase, the supply voltage in each power consumption mode is less than the supply voltage that is supplied by using the DVFS technology. A second shadow region P2 in FIG. 9 is a power consumption gain region of the method in this embodiment of this application compared with the DVFS technology. It is verified that, compared with the DVFS technology, the method in this embodiment of this application can ensure that an overall power consumption gain of the CPU is more than 10%.

It can be learned from the foregoing that, regardless of the operating frequency, the method in this application can further reduce power consumption of the processor. Therefore, compared with the DVFS technology, the method provided in this embodiment of this application not only can further reduce power consumption of the processor, but also enables the processor to operate normally at a lowest supply voltage in a plurality of power consumption modes such as the low power mode, the rated mode, and the overclocking modes (the first overclocking mode and the second overclocking mode), so as to reduce power consumption of the processor in all cases, thereby reducing a heating degree of the processor in a case of a heavy load, and enabling the processor to operate at a higher operating frequency or even overclock, thereby improving processor performance.

In a possible embodiment, the specified supply voltage V of the operating frequency in the next time period may be provided by the processor, and the specified voltage slope R of the operating frequency in the next time period may exist in the power supply, or may be provided by the processor.

When the processor provides only the specified supply voltage V of the operating frequency in the next time period to the power supply, in actual application, the stored specified voltage slope may be stored in the storage medium of the electronic device, or may be stored in a storage medium that the power supply has.

For example, the specified voltage slope exists in the power supply in a form of a constant voltage slope. The processor does not need to dynamically specify the specified voltage slope R of the operating frequency in the next time period in the power supply over a communications interface between the processor and the power supply, thereby effectively reducing a communication delay and a voltage scaling delay, and increasing a voltage scaling speed. For example, that the processor sends power supply scaling information to the power supply based on an operating frequency in a next time period includes:

Operation 1011A: The processor searches a target correspondence for the specified supply voltage V of the operating frequency in the next time period based on the operating frequency in the next time period.

Operation 1012A: The processor sends the specified supply voltage V of the operating frequency in the next time period to the power supply.

After the processor finds, from the target correspondence, the specified supply voltage of the operating frequency in the next time period based on the operating frequency in the next time period, the processor sends the specified supply voltage to the power supply by using a PMBus interface of the processor, and a PMBus interface of the power supply receives the specified supply voltage of the operating frequency in the next time period.

The target correspondence may be a correspondence among an operating frequency, a specified supply voltage, and a voltage slope that are of the processor. Certainly, the target correspondence may alternatively be a correspondence, between an operating frequency and a specified supply voltage that are of the processor, that is determined by using the DVFS technology.

In actual application, the power supply stores the specified voltage slope R of the operating frequency in the next time period in a form of a constant voltage slope. The constant voltage slope is a minimum value $R_{min}$ in voltage slopes allowed by the processor at specified supply voltages of all operating frequencies, where $R_{min}>0$. Because $R_{min}>0$, it can be ensured that when the processor operates at any load amount or operating frequency, the power supply can always provide a supply voltage less than or equal to the specified supply voltage to the processor, so that the processor has relatively low energy consumption. In addition, when the constant voltage slope is the specified voltage slope R of the operating frequency in the next time period, a product of the specified voltage slope of the operating frequency in the next time period and the load current may be controlled. In this way, the processor operates normally, and a case in which the processor cannot operate normally at the supply voltage $V_{out}$ as the load current increases when the constant voltage slope has a relatively large value is avoided.

When the processor provides the specified supply voltage V of the operating frequency in the next time period and the specified voltage slope R of the operating frequency in the next time period to the power supply, the power supply scaling information further includes the specified voltage slope R of the operating frequency in the next time period. In this case, that the processor sends power supply scaling information to the power supply based on an operating frequency in a next time period includes:

Operation 1011B: The processor searches a target correspondence for the specified supply voltage V of the operating frequency in the next time period and the specified voltage slope R of the operating frequency in the next time period based on the operating frequency in the next time period.

Operation 1012B: The processor sends the specified supply voltage V of the operating frequency in the next time period and the specified voltage slope R of the operating frequency in the next time period to the power supply.

After the processor finds, from the target correspondence, the specified supply voltage of the operating frequency in the next time period and the specified voltage slope of the operating frequency in the next time period based on the operating frequency in the next time period, the processor sends the specified supply voltage of the operating frequency in the next time period and the specified voltage slope of the operating frequency in the next time period to the power supply by using the PMBus interface of the processor, and the PMBus interface of the power supply receives the specified supply voltage of the operating frequency in the next time period and the specified voltage slope of the operating frequency in the next time period.

In actual application, the processor sends the specified supply voltage of the operating frequency in the next time period to the power supply in a form of a VID code, uses data of 8-16 bits as the specified voltage slope in the next time period, and sends the specified supply voltage of the operating frequency in the next time period and the specified voltage slope in the next time period to the power supply. For the VID code, a VID code used in the DVFS technology may be directly used for transmission. For the data of 8-16 bits, after receiving the data of 8-16 bits, the power supply performs simple data processing to obtain the specified voltage slope in the next time period. For example, when the power supply includes a VRM chip, a logic control circuit, and a buck converter, the VRM chip may determine, based on the VID code and the data of 8-16 bits, the specified supply voltage V of the operating frequency in the next time period and the specified voltage slope R of the operating frequency in the next time period. In this case, the specified supply voltage V of the operating frequency in the next time period is used as a reference voltage, and the specified voltage slope R of the operating frequency in the next time period is used as a voltage slope of the reference voltage. The VRM chip sends the reference voltage and the voltage slope of the reference voltage to the logic control circuit. The logic control circuit scales the voltage based on the reference voltage and the voltage slope of the reference voltage, performs voltage conversion by using the buck converter to obtain a supply voltage $V_{out}$, and then supplies power to the processor by using a power supply interface of the power supply.

The target correspondence is a correspondence among an operating frequency, a specified supply voltage, and a specified voltage slope that are of the processor. Specified voltage slopes of all operating frequencies may be completely unequal or equal or may be partly equal.

When the specified voltage slopes of all the operating frequencies are completely unequal or partly equal, the specified voltage slope of the processor at each operating frequency is a voltage slope allowed by the processor at a specified supply voltage of the operating frequency. In this case, a specified voltage slope of each operating frequency in the target correspondence is a voltage slope allowed by the processor at a specified supply voltage of the operating frequency. When the supply voltage $V_{out}$ determined by the power supply meets normal operation of the processor, it is ensured that power consumption of the processor is optimized. Table 1 shows a target correspondence of a CPU in a case of specified voltage slopes of some operating frequencies being equal. It should be understood that the power consumption modes shown in Table 1 are merely examples for description. In actual application, various other power consumption modes may exist.

TABLE 1

Target correspondence in a case of specified voltage slopes of some operating frequencies being equal

| Power consumption mode | Operating frequency (GHz) | Specified supply voltage (unit: V) | Specified voltage slope (also referred to a loadline value, unit: mOhm) |
|---|---|---|---|
| Low power mode | 0.5 | 0.9 | 0 |
| Rated mode | 1.5 | 1.1 | 0.1 |
| First overclocking mode | 2.5 | 1.2 | 0.2 |
| Second overclocking mode | 3.0 | 1.3 | 0.1 |

As shown in Table 1, when the operating frequency in the next time period of the CPU is 1.5 GHz, the specified supply voltage V of the operating frequency in the next time period that is searched by the CPU is 1.1 V, and the specified voltage slope R of the operating frequency in the next time period is 0.1 mOhm. In this case, the CPU specifies a reference voltage in the power supply to 1.0 V over a communications interface such as a PMBus, and a voltage slope of the reference voltage to 0.1 mOhm. When the operating frequency in the next time period of the CPU is 2.5 GHz, the specified supply voltage V of the operating frequency in the next time period that is searched by the CPU is 1.2 V, and the specified voltage slope R of the operating frequency in the next time period is 0.2 mOhm. In this case, the CPU specifies the reference voltage in the power supply to 1.2 V over a communications interface such as a PMBus, and the voltage slope of the reference voltage to 0.2 mOhm.

When the specified voltage slopes of all the operating frequencies are completely equal, the specified voltage slopes need to be applicable to supply voltage scaling at all the operating frequencies. That is, the specified voltage slopes of the processor at all the operating frequencies are equal to a constant voltage slope. In this case, the specified voltage slopes corresponding to all the operating frequencies in the target correspondence are equal to the constant voltage slope. The constant voltage slope is applicable to supply voltage scaling at various operating frequencies, and is a minimum value $R_{min}$ in voltage slopes allowed by the processor at the specified supply voltages of all the operating frequencies, where $R_{min}>0$, for example, $R_{min}=0.1$ mOhm selected from Table 1. When all specified voltage slopes in Table 1 are set to 0.1 mOhm, a target correspondence with equal specified voltage slopes of all operating frequencies shown in Table 2 may be obtained. It should be understood that the power consumption modes shown in Table 2 are merely examples for description. In actual application, various other power consumption modes may exist.

TABLE 2

Target correspondence in a case of specified voltage slopes of all operating frequencies being equal

| Power consumption mode | Operating frequency (GHz) | Specified supply voltage (unit: V) | Specified voltage slope (also referred to a loadline value, unit: mOhm) |
|---|---|---|---|
| Low power mode | 0.5 | 0.9 | 0.1 |
| Rated mode | 1.5 | 1.1 | 0.1 |
| First overclocking mode | 2.5 | 1.2 | 0.1 |
| Second overclocking mode | 3.0 | 1.3 | 0.1 |

The specified voltage slopes in Table 2 may be pre-stored in a register of the power supply in the electronic device. In this case, the power supply scaling information provided by the processor may include only the specified supply voltage V of the operating frequency in the next time period. Certainly, if the specified voltage slopes are not pre-stored in the register of the power supply in the electronic device, after the processor provides the specified supply voltage V of the operating frequency in the next time period and the specified voltage slope R of the operating frequency in the next time period to the power supply for the first time, the power supply may store the specified voltage slope R of the operating frequency in the next time period in the storage medium of the electronic device or the register of the power supply in a form of a constant voltage slope. For example, the specified voltage slope R of the operating frequency in the next time period is statically configured in the register at a time. The specified voltage slopes of all the operating frequencies in the target correspondence are equal to a constant voltage slope. Therefore, the power supply essentially stores the specified voltage slopes of all the operating frequencies in the target correspondence in a form of a constant voltage slope.

After this, when the power supply needs to scale again the supply voltage $V_{out}$ to be provided to the processor, the processor only needs to dynamically specify the reference voltage in the power supply over the communications interface, thereby reducing a communication delay and a voltage scaling delay, and shortening voltage scaling duration. For example, when the specified voltage slopes in Table 2 are not stored in the power supply, when the operating frequency in the next time period of the CPU is 1.5 GHz, the specified supply voltage of the operating frequency in the next time period that is determined by the CPU is 1.1 V, and the specified voltage slope R of the operating frequency in the next time period is 0.1 mOhm. The CPU specifies a reference voltage in the power supply to 1.0 V over a communications interface such as a PMBus, and a voltage slope of the reference voltage to 0.1 mOhm. When the power supply stores the specified voltage slopes in Table 2 in a form of a constant voltage slope, the CPU only needs to find, in the target correspondence shown in Table 2 based on the operating frequency in the next time period, that the specified supply voltage V of the operating frequency in the next time period is 1.1 V, and specifies the reference voltage in the power supply to 1.1 V over a communications interface such as a PMBus, and the power supply supplies the supply voltage $V_{out}$ to the processor based on the specified voltage slope 0.1 mOhm and the reference voltage 1.1 V.

For another example, when the specified voltage slopes in Table 2 are not stored in the power supply, when the operating frequency in the next time period of the CPU is 2.5 GHz, the specified supply voltage V of the operating frequency in the next time period that is found by the CPU is 1.2 V, and the specified voltage slope R of the operating frequency in the next time period is 0.1 mOhm. The CPU specifies the reference voltage in the power supply to 1.2 V over a communications interface such as a PMBus, and the voltage slope of the reference voltage to 0.1 mOhm. When the power supply stores the specified voltage slopes in Table 2 in a form of a constant voltage slope, the CPU only needs to determine that the specified supply voltage V of the operating frequency in the next time period is 1.2 V, and specifies the reference voltage in the power supply to 1.2 V over a communications interface such as a PMBus, and the power supply supplies the supply voltage $V_{out}$ to the processor based on the specified voltage slope 0.1 mOhm and the reference voltage 1.2 V.

It should be noted that, when the specified voltage slope R of the operating frequency in the next time period exists in the power supply in a form of a constant voltage slope, in addition to the target correspondences shown in Table 1 and Table 2, the target correspondence may be a correspondence between an operating frequency and a specified supply voltage shown in Table 3. It should be understood that the power consumption modes shown in Table 3 are merely examples for description. In actual application, various other power consumption modes may exist.

TABLE 3

Correspondence between an operating frequency and a specified supply voltage

| Mode | Operating frequency (GHz) | Specified supply voltage (unit: V) |
|---|---|---|
| Low power mode | 0.5 | 0.9 |
| Rated mode | 1.5 | 1.1 |
| First overclocking mode | 2.5 | 1.2 |
| Second overclocking mode | 3.0 | 1.3 |

The correspondence between an operating frequency and a specified supply voltage shown in Table 3 may directly refer to a correspondence, between an operating frequency and a specified supply voltage that are of the processor, used in the DVFS technology in prior approaches. Certainly, a user may reconstruct the correspondence.

It should be noted that, when the target correspondence is a correspondence among an operating frequency, a specified supply voltage, and a specified voltage slope that are of the processor, regardless of whether the specified voltage slopes in the target correspondence are completely equal, one of the following several manners is used to store the correspondence in a storage medium. The storage medium includes but is not limited to a BIOS memory of a mainboard or a built-in memory of the processor.

In a first storage manner, the target correspondence is stored in the storage medium in a form of a correspondence or a correspondence table among an operating frequency, a specified supply voltage, and a specified voltage slope that are of the processor.

In a second storage manner, the target correspondence essentially includes two sub-correspondences. For example, the two sub-correspondences include a correspondence between an operating frequency and a specified supply voltage that are of the processor, and a correspondence between an operating frequency and a specified voltage slope that are of the processor. For another example, the two sub-correspondences include a correspondence between a specified voltage slope and a specified supply voltage, and a correspondence between an operating frequency of the processor and a specified supply voltage of the processor. For still another example, the two sub-correspondences include a correspondence between a specified voltage slope and a specified supply voltage, and a correspondence between an operating frequency of the processor and a specified voltage slope of the processor.

In a possible embodiment, the target correspondence may be stored in the storage medium before or after factory delivery.

After the electronic device is delivered from the factory, a target correspondence or a relationship table formed by using a target correspondence is measured and stored in the storage medium. It should be understood that, after the electronic device is delivered from the factory, performance of the processor in the electronic device is determined. Therefore, a target correspondence obtained by directly debugging the electronic device after the electronic device is delivered from the factory is a target correspondence of the processor in the electronic device in which the storage medium is located. In this case, the target correspondence is best adapted to the processor included in the electronic device.

For another example, before the electronic device is delivered from the factory, a target correspondence or a relationship table formed by using a target correspondence is stored in the storage medium.

In actual application, for processors with different performance, if a same target correspondence is used, a problem that the target correspondence does not match the processor included in the electronic device may occur. In a case of batch production, it should be ensured that a target correspondence stored in the storage medium before factory delivery is widely applicable, so that different processors can use a same target correspondence. For example, the target correspondence is a target correspondence of a reference processor. The reference processor is a processor with a maximum lowest supply voltage in a plurality of processors at a same operating frequency. In this case, the reference processor is a processor with worst performance in the plurality of processors. If the plurality of processors are measured by using a CPM circuit, it is found that when the plurality of processors operate at a same operating frequency, the reference processor corresponds to a longest delay time and a highest oscillation frequency of the CPM circuit. In this case, the target correspondence of the reference processor may be applied to any processor in the plurality of processors. Therefore, when the target correspondence of the reference processor is used as the target correspondence, the target correspondence is widely applicable. It should be understood that a lowest supply voltage of each processor when operating at a given operating frequency may determine performance of the processor. For a processor or chip with good performance, a lowest supply voltage for operating at a given operating frequency is relatively low, and for a processor or chip with relatively poor performance, a lowest supply voltage for operating at a given operating frequency is relatively high. Performance differences of different processors are mainly caused by processes or aging of the processors. For processors of a same model, different batches of processors may differ.

The following uses examples to describe a classification manner of a plurality of processors and a selection principle of a reference processor. The following description is used for explanation and is not restrictive.

A processor or chip with relatively poor performance is defined as a slow chip, and a processor or chip with relatively good performance is defined as a fast chip. In comprehensive consideration of differences (such as an aging difference and a process variation difference) between an extreme fast chip (a fast chip with best performance) and an extreme slow chip (a slow chip with worst performance), all processors between the extreme fast chip and the extreme slow chip are divided into n processor intervals. One processor may be selected from each processor interval as the interval processor. At a given operating frequency (such as 0.9 GHz-1.5 GHz), lowest supply voltages of n interval processors are measured, a processor or chip with a minimum one of the lowest supply voltages is selected as a reference processor, and then a target correspondence of the reference processor is measured and stored in the storage medium.

It should be noted that there may be one or more slow chips. When there are a plurality of slow chips, a difference between the plurality of slow chips is mainly reflected in a process difference. Similarly, there may be one or more fast chips. When there are a plurality of fast chips, a difference between the plurality of fast chips is mainly reflected in a process difference.

In view of differences (aspects such as a process and performance) between the processor included in the electronic device and the reference processor, if the target correspondence of the reference processor is directly used to search for the specified supply voltage V of the operating frequency in the next time period and the specified voltage slope R of the operating frequency in the next time period, although power consumption of the processor can still be reduced to some extent, a deviation of a searched result is relatively large, which results in a relatively poor power consumption reduction effect and reliability.

Figure 10:
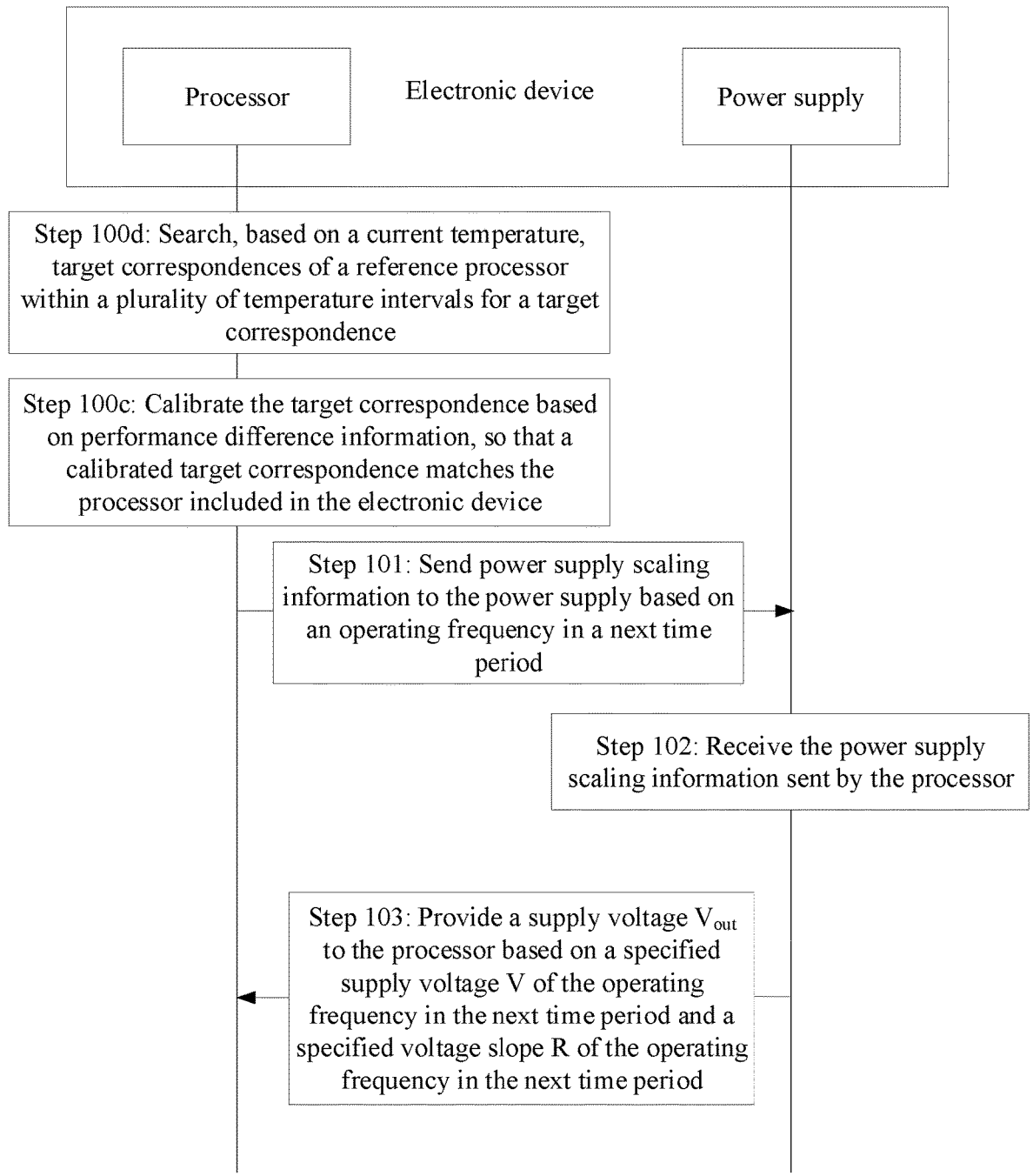
FIG. 10 is a schematic flowchart 3 of a voltage scaling method according to an embodiment of this application

To ensure that the target correspondence has good adaptation to the processor included in the electronic device, the reference processor should be calibrated. For example, an AVS technology is used to calibrate the reference processor. Specifically, as shown in FIG. 10, before the processor searches the target correspondence for the specified supply voltage of the operating frequency in the next time period based on the operating frequency in the next time period, the method further includes:

Operation 100c: The processor calibrates the target correspondence based on performance difference information, so that a calibrated target correspondence matches the processor included in the electronic device. The performance difference information is measured by the CPM circuit. Depending on different representation manners of the performance difference information, the performance difference information may be a delay level such as a delay time or an oscillation frequency. Based on a difference source, the performance difference information is process performance difference information, operating temperature performance difference information, or aging performance difference information. For example, for a same batch of processors, lowest supply voltages are different at a given operating frequency due to process differences. For another example, at a given operating frequency, lowest supply voltages of a same processor within different temperature ranges are different. For still another example, at a given operating frequency, lowest supply voltages of a same processor at different aging degrees are different.

When the temperature difference is not considered, to cooperate with the processor to calibrate the target correspondence, the storage medium should further pre-store a correspondence between performance differences of a plurality of processors and lowest supply voltage differences in a case of not considering the temperature difference. For ease of description, the correspondence between performance differences and lowest supply voltage differences that are of a plurality of processors is referred to as a correspondence of differences of a plurality of processors in the following.

In the correspondence of differences of a plurality of processors, a performance difference of each processor may be represented by a delay level (such as a delay time) or an oscillation frequency of the processor, or may be indirectly represented by a delay difference or an oscillation frequency difference between the processor and the reference processor at a same voltage. A lowest supply voltage difference corresponding to the performance difference of each processor refers to a lowest supply voltage difference between the processor and the reference processor at a same operating frequency.

When temperature impact is not considered, the performance difference information is detected by the CPM circuit, and that the processor calibrates the target correspondence based on the performance difference information, so that the target correspondence matches the processor includes:

The processor searches for a lowest supply voltage difference from the correspondence of differences of a plurality of processors based on the performance difference information, and calibrates, based on the lowest supply voltage difference, a specified supply voltage corresponding to each operating frequency in the target correspondence, so that a calibrated target correspondence matches the processor included in the electronic device. The performance difference information may reflect a current status (such as performance, an aging degree, a process variation, and a use environment) of the processor included in the electronic device. Therefore, the processor searches for the lowest supply voltage difference from the correspondence of differences of a plurality of processors based on the performance difference information, so that it can be ensured that after the processor calibrates, based on the lowest supply voltage difference, the specified supply voltage of each operating frequency included in the target correspondence, the target correspondence better matches the processor included in the electronic device.

When temperature impact is considered, to cooperate with the processor to calibrate the target correspondence, the storage medium should further pre-store a correspondence between performance differences and lowest supply voltage differences that are of a plurality of processors within a plurality of temperature intervals. For ease of description, the correspondence between performance differences and lowest supply voltage differences that are of a plurality of processors within a plurality of temperature intervals is referred to as a correspondence of differences of a plurality of processors within a plurality of temperature intervals in the following.

When temperature impact is considered, the performance difference information is detected by the CPM circuit, and that the processor calibrates the target correspondence based on the performance difference information, so that the target correspondence matches the processor included in the electronic device includes:

The processor searches, based on a current temperature, the correspondence between performance differences and lowest supply voltage differences that are of a plurality of processors within a plurality of temperature intervals for a correspondence between performance differences and lowest supply voltage differences that are of a plurality of processors within a temperature interval of the current temperature; searches, based on the performance difference information, the correspondence between performance differences and lowest supply voltage differences that are of a plurality of processors within the temperature interval of the current temperature for a lowest supply voltage difference that matches the current performance difference information; and calibrates, based on the lowest supply voltage difference that matches the performance difference information, a specified supply voltage corresponding to each operating frequency in the target correspondence, so that a calibrated target correspondence matches the processor included in the electronic device, so as to take into consideration impact of the current temperature on the target correspondence, and further improve matching between the target correspondence and the processor included in the electronic device.

The correspondence of differences of a plurality of processors within a plurality of temperature intervals may be divided into correspondences of differences of a plurality of processors within n temperature intervals based on operating temperatures, and a correspondence of differences of a plurality of processors within each temperature interval is included in the correspondence of differences of a plurality of processors within the temperature interval. Certainly, target correspondences of a plurality of processors may alternatively be divided into correspondences of differences of a plurality of processors within n processor intervals based on different processor intervals, and a correspondence of differences of a plurality of processors within each processor interval includes a correspondence of differences of processors within the processor interval within a plurality of temperature intervals.

For a same processor, performance difference information measured by a built-in CPM circuit of the processor varies with operating temperatures. If temperature impact on the performance difference information is not considered, deviation accuracy of the found lowest supply voltage difference is not very high. For example, when the storage medium stores a correspondence of differences of a plurality of processors measured at 25° C. and the target correspondence of the reference processor, and the electronic device is powered on after factory delivery, the built-in CPM circuit of the processor measures performance difference information at 45° C., and a lowest supply voltage difference found, based on the performance difference information measured at 45° C., from the correspondence of differences of a plurality of processors measured at 25° C. has a relatively large deviation.

If temperature impact on the performance difference information is considered, deviation accuracy of the found lowest supply voltage difference is relatively high. For example, when the storage medium stores a correspondence of differences of a plurality of processors within a plurality of temperature intervals (including 45° C.) and the target correspondence of the reference processor, and the electronic device is powered on after factory delivery, the built-in CPM circuit of the processor measures performance difference information at 45° C., so that a lowest supply voltage difference found, based on the performance difference information measured at 45° C., from the correspondence of differences of a plurality of processors within a plurality of temperature intervals (including 45° C.) has a relatively small deviation, compared with the solution that does not consider temperature impact on the performance difference information.

It should be noted that, regardless of a case in which a temperature difference is considered or a case in which a temperature difference is not considered, if impact of an operating frequency on a lowest supply voltage difference is considered, the found lowest supply voltage difference essentially includes lowest supply voltage differences of the processor at a plurality of operating frequencies, and these operating frequencies are in a one-to-one correspondence with operating frequencies included in the target correspondence. In this case, specified supply voltages of a plurality of operating frequencies in the target correspondence are calibrated based on the lowest supply voltage differences of the processor at the plurality of operating frequencies. If impact of the operating frequency on the lowest supply voltage difference is not considered, the found lowest supply voltage difference essentially includes a lowest supply voltage difference of the processor at a specific operating frequency. In this case, specified supply voltages of all operating frequencies in the target correspondence are calibrated based on the lowest supply voltage difference of the processor at the specific operating frequency. For calibration of the target correspondence in the following, reference may be made to the description herein about whether the operating frequency is considered.

When the correspondence of differences is stored in the storage medium in a form of a correspondence table, a method for calibrating the target correspondence by the processor based on the performance difference information is defined as a table lookup method. The following describes a specific process of the table lookup method when a CPM circuit is built into a processor.

Operation 1: Before factory delivery, test a target correspondence table of a reference processor by using the reference processor as a test object. The target correspondence of the reference processor is stored in a storage medium.

Operation 2: Before factory delivery, divide an operating temperature range into a plurality of temperature intervals, select one temperature from each temperature interval, and determine a correspondence table of differences of a plurality of processors within a corresponding temperature interval. In addition, target correspondences of the plurality of temperature intervals are stored in the storage medium.

For example, the operating temperature range is 0° C.-100° C. 0° C.-100° C. is divided into five temperature intervals at an interval of 20° C.: 0° C.-20° C., 21° C.-40° C., 41° C.-60° C., 61° C.-80° C., and 81° C.-100° C. 15° C. is selected from 0° C.-20° C., 28° C. is selected from 21° C.-40° C., 50° C. is selected from 41° C.-60° C., 75° C. is selected from 61° C.-80° C., and 90° C. is selected from 81°

C.-100° C. Then, delay times and lowest supply voltages of built-in CPM circuits of a plurality of processors and the reference processor are separately tested at 15° C., 28° C., 50° C., 75° C. and 90° C. A correspondence table of differences of the plurality of processors within the five temperature intervals is obtained based on delay differences and lowest supply voltage differences of the built-in CPM circuits of the plurality of processors and the reference processor. Table 4 shows a correspondence of differences of three types of processors within a temperature interval of 50° C.

TABLE 4

Correspondence of differences of three types of processors within a temperature interval of 50° C.

| Processor type | Delay difference/ns | Lowest supply voltage difference/V |
| --- | --- | --- |
| First-type processor | $\Delta\chi 1$ | $\Delta v1$ |
| Second-type processor | $\Delta\chi 2$ | $\Delta v2$ |
| Third-type processor | $\Delta\chi 3$ | $\Delta v3$ |

$\Delta X1$ is a delay difference between built-in CPM circuits of the first-type processor and the reference processor, $\Delta X2$ is a delay difference between built-in CPM circuits of the second-type processor and the reference processor, $\Delta X3$ is a delay difference between built-in CPM circuits of the third-type processor and the reference processor, and $\Delta v1$ is a lowest supply voltage difference between the first-type processor and the reference processor. $\Delta v2$ is a lowest supply voltage difference between the second-type processor and the reference processor, and $\Delta v3$ is a lowest supply voltage difference between the third-type processor and the reference processor.

Operation 3: After factory delivery, when the electronic device is in use, the CPM circuit measures a current delay time, and the processor searches, based on a current temperature, a correspondence table of differences of a plurality of processors within a plurality of temperature intervals for a correspondence table of differences of a plurality of processors within a temperature interval of the current temperature. A current delay difference is determined based on a current delay time measured by the built-in CPM circuit of the processor and a current delay time measured by the built-in CPM circuit of the reference processor. The correspondence table of differences of a plurality of processors within the temperature interval of the current temperature is searched based on the current delay difference for a lowest supply voltage difference corresponding to a delay difference close to the current delay difference (a delay difference proximity degree may be set based on an actual situation) or same as the current delay difference, and a specified supply voltage of each operating frequency in the target correspondence of the reference processor is calibrated based on a found lowest supply voltage difference.

For example, a current operating temperature is 45° C., the CPM circuit measures a delay time at 45° C., and a current delay difference is obtained based on a delay time measured at 45° C. by the built-in CPM circuit of the processor and a delay time measured at 50° C. by the built-in CPM circuit of the reference processor. Because a temperature interval of 45° C. is 41° C.-60° C., a delay difference close to the current delay difference (the delay difference proximity degree may be set based on an actual situation) or same as the current delay difference is found in Table 4 based on the current delay difference, and then a lowest supply voltage difference is found in Table 4 based on the found delay difference. If a specified supply voltage of a specific operating frequency in the target correspondence of the reference processor is V, and a determined lowest supply voltage difference is $\Delta v3$, a calibrated specified supply voltage is equal to V+$\Delta v3$.

When the correspondence of differences is stored in the storage medium in a form of a mathematical function expression, a method for calibrating the target correspondence by the processor based on the performance difference information is defined as a mathematical derivation method. The following describes a specific process of the mathematical derivation method when a CPM circuit is built into a processor.

Operation 1: Before factory delivery, test a target correspondence table of a reference processor by using the reference processor as a test object. The target correspondence of the reference processor is stored in a storage medium.

Operation 2: Before factory delivery, divide an operating temperature range into a plurality of temperature intervals, select one temperature from each temperature interval, determine delay differences and lowest supply voltage differences of a plurality of processors at the temperature, and fit the delay differences and the lowest supply voltage differences of the plurality of processors to determine a function relational expression between the delay differences and the lowest supply voltage differences of the plurality of processors at the temperature. The function relational expression is $\Delta v = k\Delta X + a$, where k is a coefficient, a is a fixed constant, $\Delta X$ is a delay difference, and $\Delta v$ is a lowest supply voltage difference. The mathematical function expression is stored in the storage medium.

For example, the operating temperature range is 0° C.-100° C. 0° C.-100° C. is divided into five temperature intervals at an interval of 20° C.: 0° C.-20° C., 21° C.-40° C., 41° C.-60° C., 61° C.-80° C., and 81° C.-100° C. 15° C. is selected from 0° C.-20° C., 28° C. is selected from 21° C.-40° C., 50° C. is selected from 41° C.-60° C., 75° C. is selected from 61° C.-80° C., and 90° C. is selected from 81° C.-100° C. Then, five mathematical function relational expressions are fitted at 15° C., 28° C., 50° C., 75° C., and 90° C. respectively, and the five mathematical function expressions are respectively corresponding to the mathematical function relational expressions of the five temperature intervals.

Operation 3: After factory delivery, when the electronic device is in use, the CPM circuit measures a current delay time; and the processor selects a mathematical function relational expression based on a temperature interval of a current temperature, obtains a current delay difference based on a current delay time of a built-in CPM circuit of the processor and a current delay time of a built-in CPM circuit of the reference processor at the current temperature, calculates a lowest supply voltage difference by substituting the current delay difference into the selected mathematical function relational expression, and calibrates the target correspondence of the reference processor based on the lowest supply voltage difference.

For example, a current operating temperature is 45° C. The built-in CPM circuit of the processor measures a current delay time at 45° C. A current delay difference is obtained based on the current delay time measured by the built-in CPM circuit of the processor at 45° C. and a delay time of the built-in CPM circuit of the reference processor at 45° C. The current delay difference is substituted into a mathematical function relational expression of a temperature interval of 50° C. that is fitted at 50° C. to obtain a lowest supply voltage difference. If a specified supply voltage of a specific operating frequency in the target correspondence of the reference processor is V, and a determined lowest supply voltage difference is Δv3, a calibrated specified supply voltage is equal to V+Δv3.

It should be noted that, when temperature impact is not considered, the determined correspondence of differences of a plurality of processors may be considered as a correspondence of differences of a plurality of processors within one temperature interval, and the temperature interval has a relatively wide range. For example, when temperature impact is considered, the operating temperature of 0° C.-100° C. is divided into five temperature intervals: 0° C.-20° C., 21° C.-40° C., 41° C.-60° C., 61° C.-80° C., and 81° C.-100° C. If temperature impact is ignored, it may be considered that the correspondence of differences of a plurality of processors is a correspondence of differences of a plurality of processors measured within a temperature interval of 0° C.-100° C.

In a possible embodiment, a plurality of target correspondences are written into the electronic device before factory delivery, and after factory delivery, final target correspondences are determined through debugging. In this case, the storage medium stores target correspondences of the reference processor within a plurality of temperature intervals or target correspondences of a plurality of processors.

When the storage medium stores the target correspondences of the reference processor within a plurality of temperature intervals, as shown in FIG. 10, before the processor sends the power supply scaling information to the power supply based on the operating frequency in the next time period, the method further includes:

Operation 100d: The processor searches, based on a current temperature, the target correspondences of the reference processor within a plurality of temperature intervals for a target correspondence. The target correspondence is a target correspondence of the reference processor within a temperature interval of the current temperature. In this case, the determined target correspondence of the reference processor considers temperature impact on the target correspondence, so that a calibrated target correspondence better matches the processor included in the electronic device.

The following describes a process of determining and calibrating the target correspondence of the reference processor by using the foregoing table lookup method as an example.

Operation 1: Before factory delivery, an operating temperature range of the reference processor is 0° C.-100° C. 0° C.-100° C. is divided into five temperature intervals at an interval of 20° C.: 0° C.-20° C., 21° C.-40° C., 41° C.-60° C., 61° C.-80° C., and 81° C.-100° C. 15° C. is selected from 0° C.-20° C., 28° C. is selected from 21° C.-40° C., 50° C. is selected from 41° C.-60° C., 75° C. is selected from 61° C.-80° C., and 90° C. is selected from 81° C.-100° C. Then, target correspondences of the reference processor are separately tested at 15° C., 28° C., 50° C., 75° C., and 90° C. to obtain target correspondences of the processor within the five temperature intervals.

Operation 2: Before factory delivery, separately test delay times and lowest supply voltages of built-in CPM circuits of a plurality of processors and the reference processor at 15° C., 28° C., 50° C., 75° C. and 90° C. A correspondence table of differences of the plurality of processors at 15° C., 28° C., 50° C., 75° C. and 90° C. is obtained based on delay differences and lowest supply voltage differences of the built-in CPM circuits of the plurality of processors and the reference processor, that is, a correspondence of differences of a plurality of processors within a plurality of temperature intervals.

Operation 3: After factory delivery, when the electronic device is in use, a current operating temperature is 45° C.; and the processor finds, based on a current temperature, a target correspondence of the reference processor within a temperature interval of 45° C. (that is, a target correspondence of a plurality of processors at 50° C.) from target correspondence tables of the reference processor within the five temperature intervals. The processor obtains a current delay difference based on a delay time measured by the built-in CPM circuit of the processor at 45° C. and a delay time of the built-in CPM circuit of the reference processor at 45° C., then finds a delay difference close to or same as the current delay difference from Table 4, and searches for a lowest supply voltage difference from Table 4 based on the found delay difference. If a specified supply voltage of a specific operating frequency in the found target correspondence is V, and a determined lowest supply voltage difference is Δv3, a calibrated specified supply voltage is equal to V+Δv3.

Figure 11:
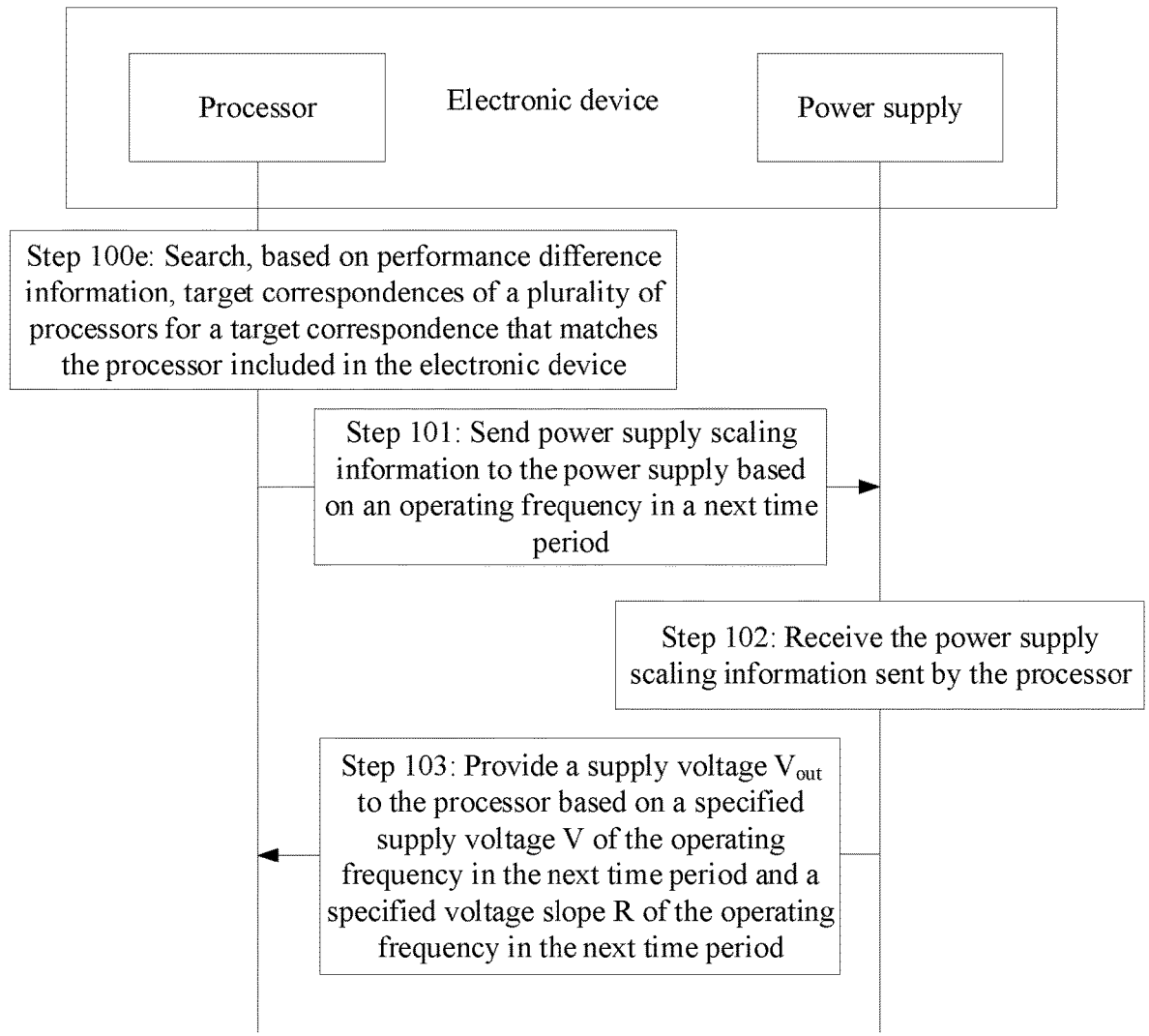
FIG. 11 is a schematic flowchart 4 of a voltage scaling method according to an embodiment of this application.

When the storage medium stores the target correspondences of the plurality of processors, in a case of not considering temperature impact, the CPM circuit detects performance difference information when the electronic device is powered on. As shown in FIG. 11, before the processor searches the target correspondence for the specified supply voltage of the operating frequency in the next time period based on the operating frequency in the next time period, the method further includes:

Operation 100e: The processor searches, based on performance difference information, target correspondences of a plurality of processors for a target correspondence that matches the processor included in the electronic device.

A CPM circuit is built into each processor when a temperature is not considered. To cooperate with the processor to search for the target correspondence that matches the processor included in the electronic device, the performance difference information such as oscillation frequencies or delay times of the plurality of processors may be measured by using the built-in CPM circuit of each processor before factory delivery, and a relationship is established between the performance difference information of the plurality of processors and the target correspondences of the plurality of processors. The performance difference information of the plurality of processors and the target correspondences of the plurality of processors are stored in the storage medium. For example, the performance difference information of each processor is a delay time of the processor. When the electronic device is powered on at factory delivery, the built-in CPM circuit of the processor determines the target correspondence based on the delay time.

Figure 12:
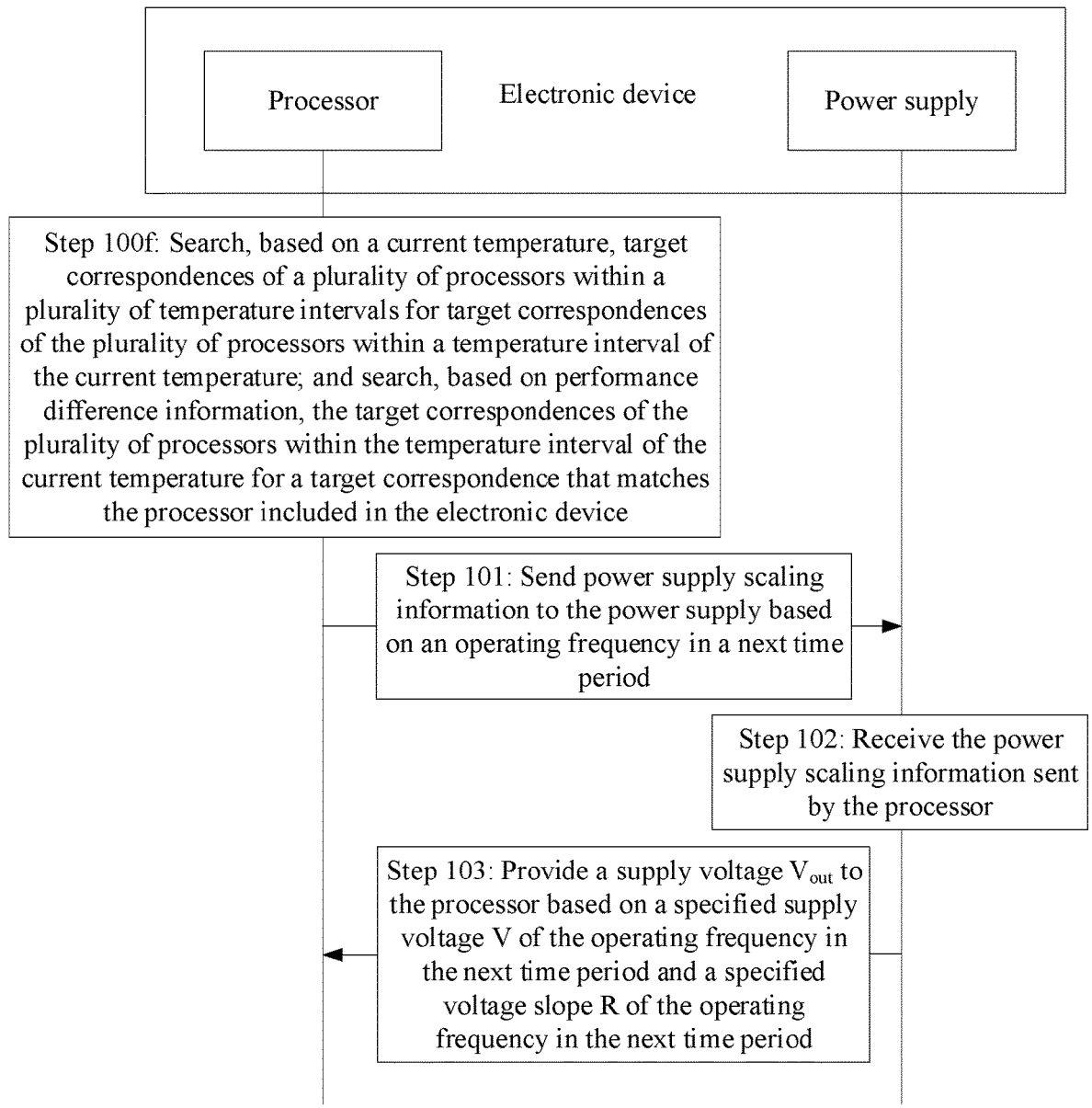
FIG. 12 is a schematic flowchart 5 of a voltage scaling method according to an embodiment of this application.

When a temperature is considered, as shown in FIG. 12, before the processor sends the power supply scaling information to the power supply based on the operating frequency in the next time period, the method further includes:

Operation 100f: The processor searches, based on a current temperature, target correspondences of a plurality of processors within a plurality of temperature intervals for target correspondences of the plurality of processors within a temperature interval of the current temperature; and searches, based on performance difference information, the target correspondences of the plurality of processors within the temperature interval of the current temperature for a target correspondence that matches the processor included in the electronic device.

The target correspondences of the plurality of processors within the plurality of temperature intervals may be divided into target correspondences of n temperature intervals based on operating temperatures. A target correspondence of each temperature interval includes a target correspondence of the plurality of processors within the temperature interval. Certainly, the target correspondences of the plurality of processors may further be divided into target correspondences of n processor intervals based on different processor intervals. A target correspondence of each processor interval includes a target correspondence of processors within a same interval within n temperature intervals. It should be understood that the target correspondence of processors within a same interval within n temperature intervals refers to: selecting one processor from all processors within the processor interval as a test object, and testing a target correspondence of the processor within n temperature intervals. In addition, when n is equal to 1, the target correspondences of the plurality of processors have only one temperature interval. In this case, the target correspondences may be considered as target correspondences of the plurality of processors in a case of not considering the temperature. When n is an integer greater than or equal to 2, the target correspondences of the plurality of processors have two or more temperature intervals. In addition, a larger n indicates more temperature intervals, and a target correspondence finally determined by the processor is closer to a real target correspondence.

To cooperate with searching, based on the performance difference information, the target correspondences of the plurality of processors for the target correspondence that matches the processor included in the electronic device, the storage medium should further pre-store performance difference information of the plurality of processors within the plurality of temperature intervals. In addition, the performance difference information of the plurality of processors within the plurality of temperature intervals should be interdependent with the target correspondences of the plurality of processors within the plurality of temperature intervals, and then the performance difference information of the plurality of processors within the plurality of temperature intervals and the target correspondences of the plurality of processors within the plurality of temperature intervals are stored in the storage medium.

In one case, the performance difference information of the plurality of processors within the plurality of temperature intervals may be classified based on temperature intervals to obtain a plurality of types of performance difference information that are in a one-to-one correspondence with the plurality of temperature intervals. Each type of performance difference information includes performance difference information (such as a delay time or an oscillation frequency) of the plurality of processors within the temperature interval.

In another case, the performance difference information of the plurality of processors within the plurality of temperature intervals may be classified based on processor intervals to obtain a plurality of types of performance difference information that are in a one-to-one correspondence with the plurality of processor intervals. Each type of performance difference information includes performance difference information (such as a delay time or an oscillation frequency) of processors within a same interval within the plurality of temperature intervals.

For example, an operating temperature range of the processor is 0° C.-100° C. 0° C.-100° C. is divided into five temperature intervals at an interval of 20° C.: 0° C.-20° C., 21° C.-40° C., 41° C.-60° C., 61° C.-80° C., and 81° C.-100° C. 15° C. is selected from 0° C.-20° C., 28° C. is selected from 21° C.-40° C., 50° C. is selected from 41° C.-60° C., 75° C. is selected from 61° C.-80° C., and 90° C. is selected from 81° C.-100° C. Then, target correspondences of the plurality of processors and delay times of the plurality of processors are separately measured at 15° C., 28° C., 50° C., 75° C., and 90° C., to obtain target correspondences of the plurality of processors within the five temperature intervals and delay times of the plurality of processors within the five temperature intervals, and establish a dependency relationship between target correspondences of the plurality of processors within each temperature interval and delay times of the plurality of processors within the temperature interval. When the electronic device is powered on, the built-in CPM circuit of the processor detects a current delay time at 45° C. Delay times of the plurality of processors within a temperature interval of 45° C. (that is, delay times of the plurality of processors at 50° C.) are searched for a close delay time or a similar delay time, and a corresponding target correspondence is determined based on a found delay time.

In a possible embodiment, regardless of when the target correspondence stored in the storage medium is stored in the storage medium, and regardless of the target correspondence stored in the storage medium includes target storage relationships of how many processors, a specified supply voltage and a specified voltage slope that are in each target correspondence are determined in the following manner, which can ensure that a supply voltage $V_{out}$ provided by the power supply to the processor can reliably and stably reduce power consumption of the processor.

The specified supply voltage in the target correspondence may be determined based on the following relationship: A specified supply voltage of the processor at each operating frequency is $V_{(i)}$, that is, a specified supply voltage of each operating frequency in the target correspondence is $V_{(i)}$. $V_{(i)}=V_{min(i)}+\Delta V_{(i)}$, $V_{min(i)}$ is a lowest supply voltage for normal operation of the processor as the load current increases when the processor operates at each operating frequency, and $\Delta V_{(i)}$ is a supply voltage margin of the processor at each operating frequency. $\Delta V_{(i)}$=20 mV-60 mV, for example, 40 mV or 50 mV or may be set based on an actual situation.

The voltage slope allowed by the processor at the specified supply voltage of each operating frequency may be determined based on the following relationship: The voltage slope allowed by the processor at the specified supply voltage of each operating frequency is $R_{(i)}$. $R_{(i)}=R_{max(i)}-\Delta R_{(i)}$. $R_{max(i)}$ is a maximum voltage slope of the processor at the specified supply voltage of each operating frequency, and $\Delta R_{(i)}$ is a voltage slope margin of the processor at each operating frequency. $\Delta R_{(i)}$=0.03 mOhm-0.08 mOhm, for example, 0.05 mOhm or 0.07 mOhm. It should be understood that, for a target correspondence in which specified voltage slopes of all operating frequencies are equal, after allowed voltage slopes $R_{(i)}$ at specified supply voltages of all operating frequencies are determined, a minimum value should be further selected from the allowed voltage slopes $R_{(i)}$ at the specified supply voltages of all the operating frequencies, and it is ensured that the minimum value is greater than 0. The minimum value is used as a specified voltage slope that may be shared by a plurality of operating frequencies, that is, the foregoing constant voltage slope.

The following uses an example to describe a process of determining a target correspondence related to the method provided in this embodiment of this application. The following example is for description only, but is not restrictive.

Figure 13:
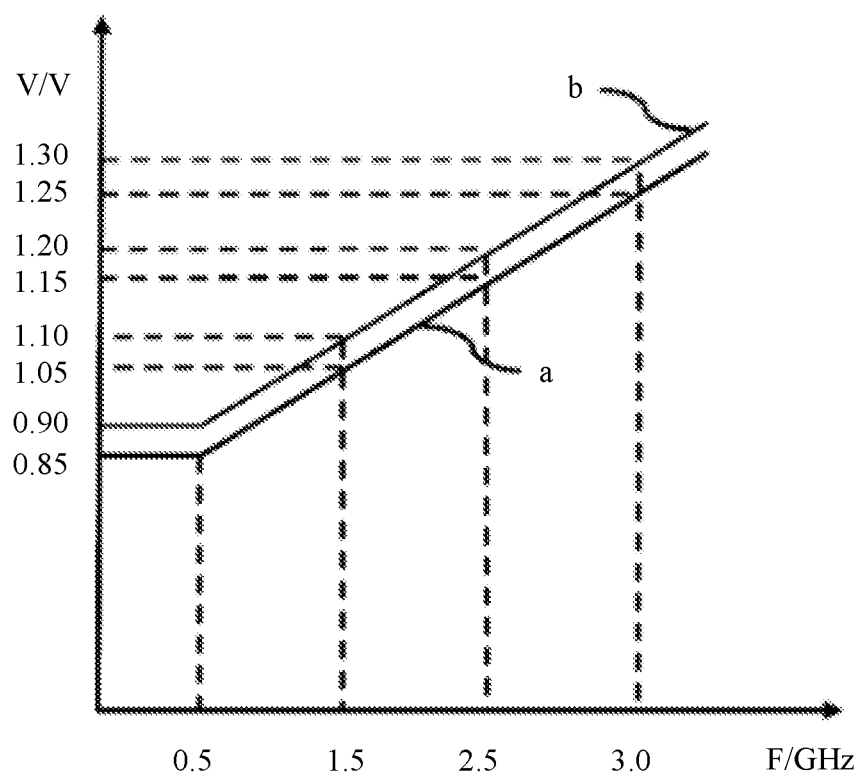
FIG. 13 shows operating frequency and voltage slope curves of a processor.

Operation 1: A process of generating a correspondence between an operating frequency and a specified supply voltage that are of the processor is as follows: Before a CPU is delivered from the factory, use a CPU evaluation board to measure a relationship between an operating frequency and a lowest supply voltage that are of the CPU. During a test, a voltage slope of a power supply is set to 0 Ohm. A test sample covers a typical chip (the typical chip is also referred to as a TT chip) and a process variation chip (also referred to as a corner chip). A test temperature covers an environment temperature (that is, an operating temperature) specified in declared CPU specifications. Operating frequency and lowest supply voltage curves of a group of processors are measured. The lowest supply voltage should be a minimum supply voltage that can ensure normal operation of the processor. In addition, a supply voltage margin is added to the lowest supply voltage of each operating frequency to obtain a specified supply voltage of the operating frequency of the processor, so as to avoid a case that a supply voltage cannot ensure normal operation of the processor when a load current increases. The supply voltage margin refers to an allowable voltage deviation value that allows a deviation of the lowest supply voltage. FIG. 13 shows operating frequency and supply voltage curves of a processor. An X-axis indicates the operating frequency, and a Y-axis indicates the supply voltage. A curve a in FIG. 13 is an operating frequency and lowest supply voltage curve of the processor, and b in FIG. 13 is an operating frequency and specified supply voltage curve of the processor. A 50 mV margin may be added to a lowest operating voltage included in the curve a in FIG. 13 to obtain the curve b in FIG. 13.

As can be seen from the curve b in FIG. 13, the curve b in FIG. 13 covers frequencies and specified supply voltages in a plurality of typical modes such as a low power mode, a rated mode, and two overclocking modes. Table 3 in the foregoing shows a correspondence between operating frequencies and specified supply voltages of the curve b in FIG. 13 in different modes. As shown in Table 3, when the CPU operates in the low power mode, the operating frequency of the CPU is relatively low and is 0.5 GHz, and the specified supply voltage is 0.9 V. When the CPU operates in the rated mode, the operating frequency of the CPU is 1.5 GHz, and the specified supply voltage is 1.1 V. When the CPU operates in the first overclocking mode, the operating frequency of the CPU exceeds a rated frequency and is 2.5 GHz, and the specified supply voltage is 1.2 V. When the CPU operates in the second overclocking mode, the operating frequency of the CPU further increases to 3.0 GHz, and the specified supply voltage is 1.3 V.

It should be noted that, alternatively, the correspondence between an operating frequency and a specified supply voltage that are of a processor in the method of this application may be formed based on a correspondence table between an operating frequency and a specified supply voltage that are of a processor used by the DVFS technology in prior approaches.

Operation 2: A process of generating a correspondence among an operating frequency, a specified supply voltage, and a specified voltage slope that are of the processor is as follows: Based on settings of an operating frequency and a voltage in each mode of the CPU, measure a maximum voltage slope that can ensure normal operation of the processor in each mode, and reserve a specific voltage slope margin, where the voltage slope margin refers to an allowable error that allows the maximum voltage slope.

Figure 14:
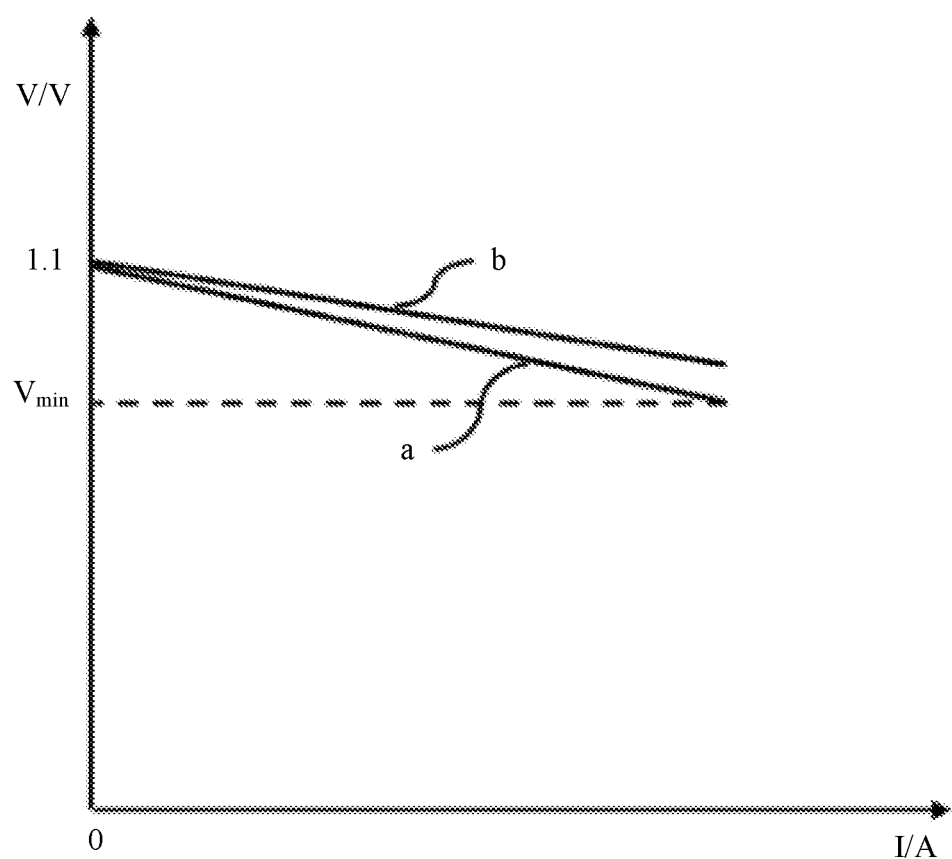
FIG. 14 is a voltage slope diagram of a supply voltage in a rated mode.

For example, FIG. 14 is a voltage slope diagram of a specified supply voltage in a rated mode. An oblique line a in FIG. 14 is a maximum voltage slope diagram of the specified supply voltage in the rated mode. When the processor is in the rated mode, the specified supply voltage is 1.1 V. When the load current rises, the specified supply voltage is controlled to actively decrease to a minimum value based on different voltage slope values, a maximum voltage slope that ensures normal operation of the processor is selected from the voltage slope values, and a specific voltage slope margin is subtracted from the maximum voltage slope to obtain a specified voltage slope of the specified supply voltage in the rated mode, that is, an oblique line b in FIG. 14.

It should be understood that the specified voltage slope cannot be too large. Otherwise, when the load current of the power supply increases, a problem that the processor cannot operate occurs. The specified voltage slope cannot be too small. Otherwise, the power consumption reduction effect of the processor is not obvious. Based on this, the specified voltage slope of each mode or operating frequency should be determined through repeated tests, and cannot be specified by using a uniform standard. For a process of determining a specified voltage slope in each of the low power mode, the first overclocking mode, and the second overclocking mode, reference is made to the process of determining the specified voltage slope in the rated mode.

Figure 15:
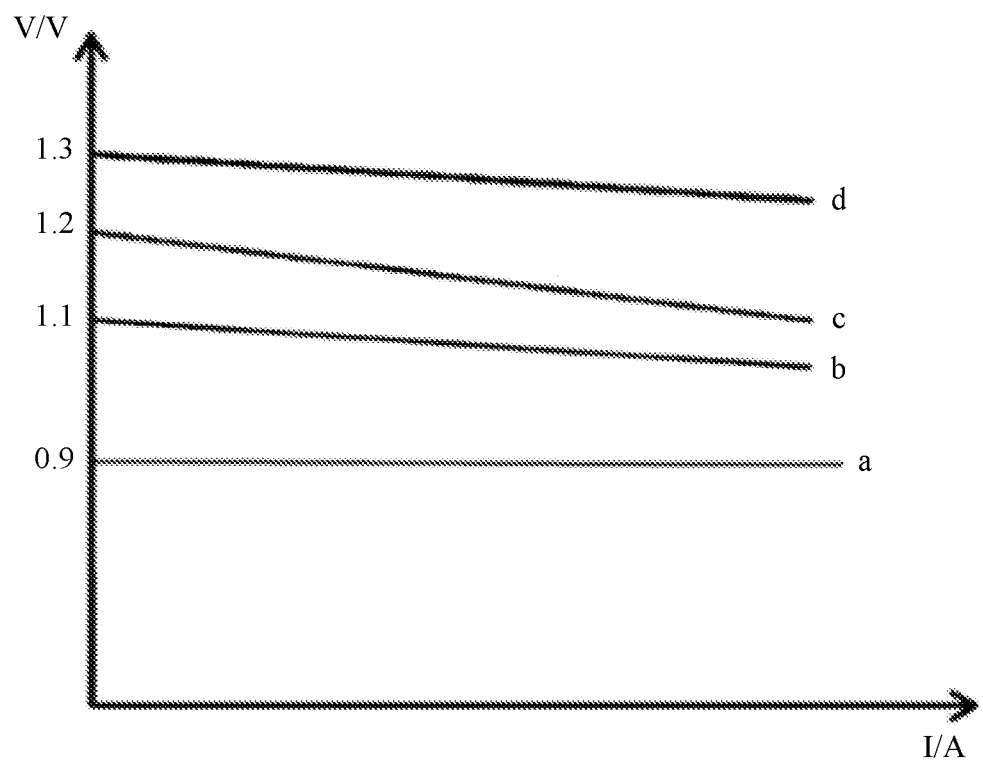
FIG. 15 is a voltage slope diagram in different power consumption modes.

FIG. 15 shows voltage loadline curves in different power consumption modes. X coordinates indicate the load current, and Y coordinates indicates the specified supply voltage. A curve a in FIG. 15 is a voltage slope curve in the low power mode, a curve b in FIG. 15 is a voltage slope curve in the rated mode, and a curve c in FIG. 15 is a voltage slope curve in the first overclocking mode. A curve d in FIG. 15 is a voltage slope curve in the second overclocking mode. The target correspondence shown in Table 1 may be determined based on the curve b in FIG. 13 and the curve a to the curve d in FIG. 15.

It should be noted that, when the specified voltage slopes corresponding to all the operating frequencies in the foregoing target correspondence are equal to a constant voltage slope, after operation 2, a minimum specified voltage slope should be further found from the specified voltage slopes corresponding to all the operating frequencies, and it is ensured that the specified voltage slope is greater than 0. The specified voltage slope is a voltage slope shared by all the operating frequencies, that is, a constant voltage slope. For example, in Table 1, in the low power mode, the rated mode, the first overclocking mode, and the second overclocking mode, a minimum specified voltage slope that is not equal to 0 is 0.1 V. Therefore, 0.1 V is used as a common specified voltage slope in the low power mode, the rated mode, the first overclocking mode, and the second overclocking mode.

The foregoing mainly describes the solutions provided in the embodiments of this application from a perspective of interaction between network elements. It may be understood that, to implement the foregoing functions, each network element, such as a processor and a power supply, includes a corresponding hardware structure and/or software module for executing each function. A person skilled in the art should be easily aware that, in combination with the examples described in the embodiments disclosed in this specification, units and algorithm operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the embodiment goes beyond the scope of the embodiments of this application.

Figure 16:
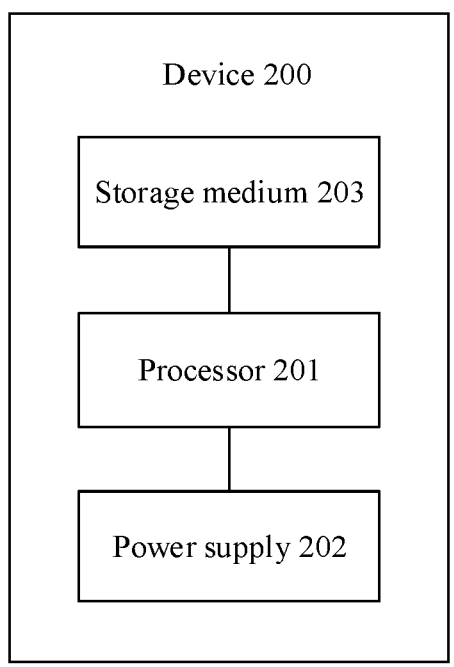
FIG. 16 is a schematic structural diagram of a device according to an embodiment of this application.

When physical hardware is used, FIG. 16 shows a device according to an embodiment of this application. The device is applied to a communications device or a terminal device, but is not limited thereto. As shown in FIG. 16, a device 200 includes a processor 201 and a power supply 202. The processor 201 is configured to support an electronic device in performing operation 101 performed by the processor in the foregoing embodiment. The power supply 202 is configured to support the electronic device in performing operation 102 and operation 103 performed by the power supply in the foregoing embodiment.

In a possible embodiment, as shown in FIG. 16, the processor 201 is further configured to perform operation 100 performed by the processor in the foregoing embodiment.

In a possible embodiment, as shown in FIG. 16, the processor 201 is further configured to support the electronic device in performing operation 100a performed by the processor in the foregoing embodiment.

The processor 201 is further configured to support the electronic device in performing operation 100b and operation 104 performed by the processor in the foregoing embodiment.

In a possible embodiment, as shown in FIG. 16, the device 200 further includes a storage medium 203, configured to store a computer program and a target correspondence. The power supply 202 stores a specified voltage slope in a form of a constant voltage slope. The processor 201 is specifically configured to perform operations 1011A and 1012A performed by the processor in the foregoing embodiment.

In another possible embodiment, as shown in FIG. 16, the device 200 further includes a storage medium 203, configured to store a computer program and a target correspondence. The processor 201 is specifically configured to perform operations 1011B and 1012B performed by the processor in the foregoing embodiment.

In a possible embodiment, as shown in FIG. 16, the device 200 further includes a storage medium 203, configured to store a computer program and a target correspondence of a reference processor, and the processor 201 is further configured to support the electronic device in performing operation 100c performed by the processor in the foregoing embodiment.

To cooperate with the processor to perform a corresponding operation, as shown in FIG. 16, the storage medium 203 is further configured to store a correspondence of differences of a plurality of processors or a correspondence of differences of a plurality of processors within a plurality of temperature intervals.

In another possible embodiment, as shown in FIG. 16, the device 200 further includes a storage medium 203, configured to store a computer program and target correspondences of a reference processor within a plurality of temperature intervals, and the processor 201 is further configured to support the electronic device in performing operation 100d performed by the processor in the foregoing embodiment. To cooperate with the processor to perform a corresponding operation, the storage medium 203 is further configured to store a correspondence of differences of a plurality of processors within a plurality of temperature intervals.

In still another possible embodiment, as shown in FIG. 16, the device 200 further includes a storage medium 203, configured to store a computer program and target correspondences of a plurality of processors, and the processor 201 is further configured to support the electronic device in performing operation 100e performed by the processor in the foregoing embodiment. To cooperate with the processor to perform a corresponding operation, the storage medium 203 is further configured to store performance difference information of a plurality of processors.

In still another possible embodiment, as shown in FIG. 16, the device 200 further includes a storage medium 203, configured to store a computer program and target correspondences of a plurality of processors within a plurality of temperature intervals, and the processor 201 is further configured to support the electronic device in performing operation 100f performed by the processor in the foregoing embodiment. To cooperate with the processor to perform a corresponding operation, the storage medium 203 is further configured to store performance difference information of a plurality of processors within a plurality of temperature intervals.

In the embodiments of this application, the processor and the power supply may be divided into functional modules based on the foregoing method examples. For example, each functional module may be obtained through division corresponding to each function, or two or more functions may be integrated into one processing module. The integrated module may be implemented in a form of hardware, or may be implemented in a form of a software functional module. It should be noted that, in this embodiment of this application, module division is exemplary, and is merely a logical function division. In actual embodiment, another division manner may be used.

Figure 17:
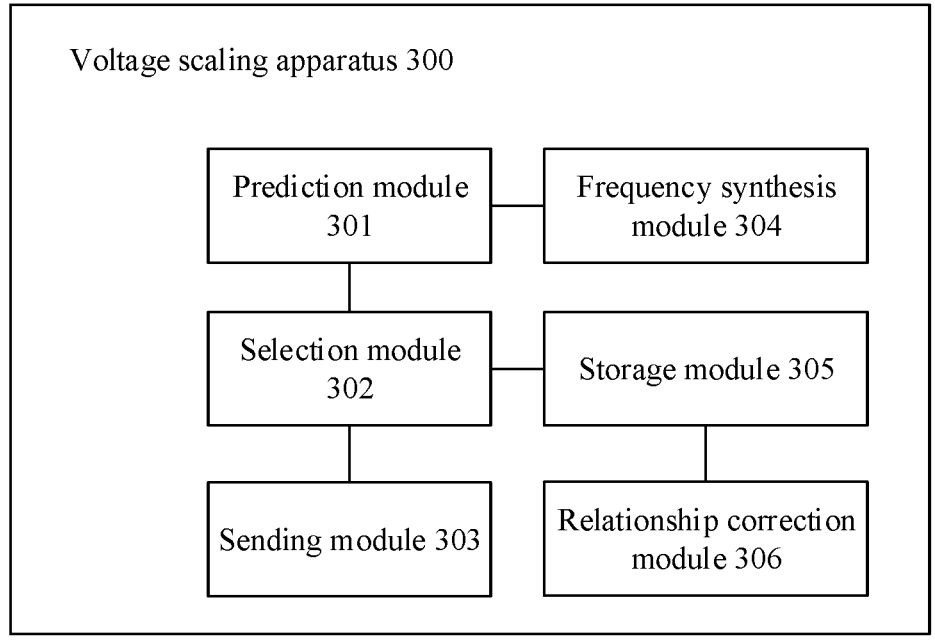
FIG. 17 is a schematic structural diagram of a voltage scaling apparatus according to an embodiment of this application.

When functional modules are obtained through division by using corresponding functions, FIG. 17 shows a schematic structural diagram of a voltage scaling apparatus in the foregoing embodiment. The voltage scaling apparatus is a processor or a chip applied to the processor. As shown in FIG. 17, a voltage scaling apparatus 300 includes a sending module 303, configured to support the voltage scaling apparatus in performing operation 101 performed by the processor in the foregoing embodiment.

In a possible embodiment, as shown in FIG. 17, the voltage scaling apparatus 300 further includes a prediction module 301, configured to support the voltage scaling apparatus in performing operation 100 performed by the processor in the foregoing embodiment.

In a possible embodiment, as shown in FIG. 17, the voltage scaling apparatus 300 further includes a frequency synthesis module 304, configured to support the voltage scaling apparatus in performing operation 100a or operation 100b and operation 104 that are performed by the processor in the foregoing embodiment.

In a possible embodiment, as shown in FIG. 17, the voltage scaling apparatus 300 further includes a selection module 302 and a storage module 305. The storage module 305 is configured to store a target correspondence. The selection module 302 is further configured to support the voltage scaling apparatus in performing operation 1011A performed by the processor in the foregoing embodiment, and the sending module 303 is further configured to support the voltage scaling apparatus in performing operation 1012A performed by the processor in the foregoing embodiment.

In another possible embodiment, as shown in FIG. 17, the voltage scaling apparatus 300 further includes a selection module 302 and a storage module 305. The storage module 305 is configured to store a target correspondence. The selection module 302 is further configured to support the voltage scaling apparatus in performing operation 1011B performed by the processor in the foregoing embodiment, and the sending module 303 is further configured to support the voltage scaling apparatus in performing operation 1012B performed by the processor in the foregoing embodiment.

In a possible embodiment, as shown in FIG. 17, the voltage scaling apparatus 300 further includes a relationship correction module 306.

In an example, as shown in FIG. 17, the storage module 305 is configured to store a target correspondence of a reference processor. The relationship correction module 306 is configured to support the voltage scaling apparatus in performing operation 100c performed by the processor in the foregoing embodiment.

To cooperate with the processor to perform a corresponding operation, the storage module 305 is further configured to store a correspondence of differences of a plurality of processors or a correspondence of differences of a plurality of processors within a plurality of temperature intervals.

In another possible embodiment, as shown in FIG. 17, the storage module 305 is configured to store target correspondences of a reference processor within a plurality of temperature intervals and a correspondence of differences of a plurality of processors within a plurality of temperature intervals. The relationship correction module 306 is configured to support the voltage scaling apparatus in performing operation 100d performed by the processor in the foregoing embodiment.

In still another example, as shown in FIG. 17, the storage module 305 is configured to store target correspondences of a plurality of processors and performance difference information of the plurality of processors. The relationship correction module 306 is configured to support the voltage scaling apparatus in performing operation 100e performed by the processor in the foregoing embodiment.

In still another example, as shown in FIG. 17, the storage module 305 is configured to store target correspondences of a plurality of processors and performance difference information of the plurality of processors within a plurality of temperature intervals. The relationship correction module 306 is configured to support the voltage scaling apparatus in performing operation 100f performed by the processor in the foregoing embodiment.

Figure 18:
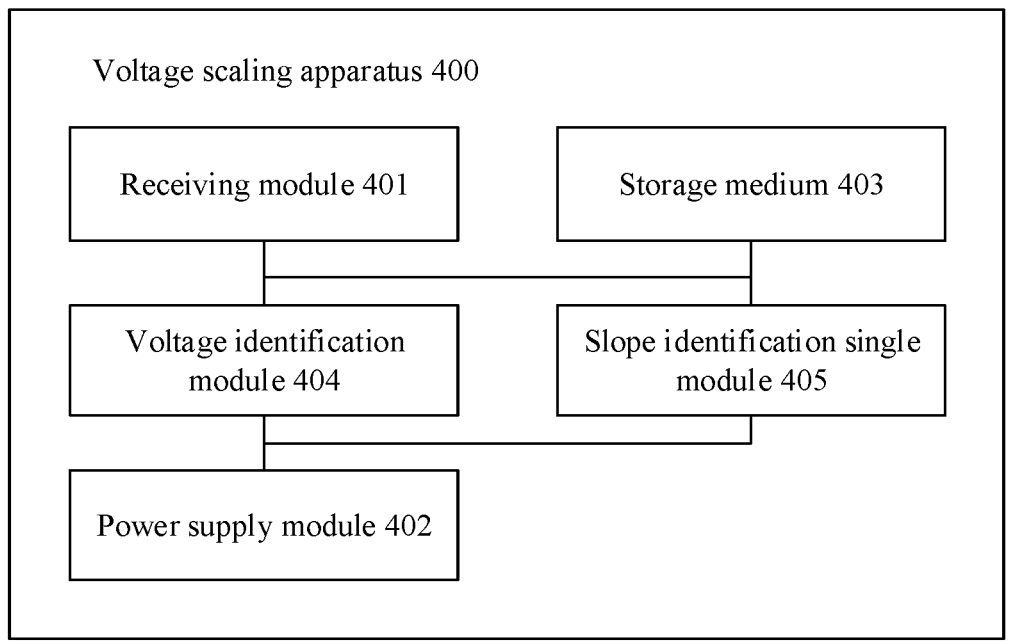
FIG. 18 is a schematic structural diagram of another voltage scaling apparatus according to an embodiment of this application.

When functional modules are obtained through division by using corresponding functions, FIG. 18 shows a schematic structural diagram of another voltage scaling apparatus in the foregoing embodiment. The voltage scaling apparatus is a power supply or a chip applied to the power supply. As shown in FIG. 18, the voltage scaling apparatus includes a receiving module 401 and a power supply module 402. The receiving module 401 is configured to support the voltage scaling apparatus in performing operation 102 performed by the power supply in the foregoing embodiment. The power supply module 402 is configured to support the voltage scaling apparatus in performing operation 103 performed by the power supply in the foregoing embodiment.

In a possible embodiment, as shown in FIG. 18, when the voltage scaling information includes a specified supply voltage V of an operating frequency in a next time period and a specified voltage slope R in the next time period, the voltage scaling apparatus 400 further includes a voltage identification module 404 and a slope identification single module 405. The voltage identification module 404 is configured to support the voltage scaling apparatus in performing the operation, performed by the power supply in the foregoing embodiment, of identifying the specified supply voltage V of the operating frequency in the next time period, so as to determine a reference voltage. The slope identification single module 405 is configured to support the voltage scaling apparatus in performing the operation, performed by the power supply in the foregoing embodiment, of determining a voltage slope of the reference voltage based on the specified voltage slope R in the next time period.

In a possible embodiment, as shown in FIG. 18, the voltage scaling apparatus 400 further includes a storage medium 403, and the storage medium 403 is configured to store a specified voltage slope that exists as a constant voltage slope. The voltage scaling apparatus 400 further includes a voltage identification module 404, configured to support the voltage scaling apparatus in performing the operation, performed by the power supply in the foregoing embodiment, of identifying the specified supply voltage V of the operating frequency in the next time period, so as to determine a reference voltage.

All related content of each operation involved in the foregoing method embodiment may be referenced to a function description of a corresponding functional module, and details are not described herein again.

Figure 19:
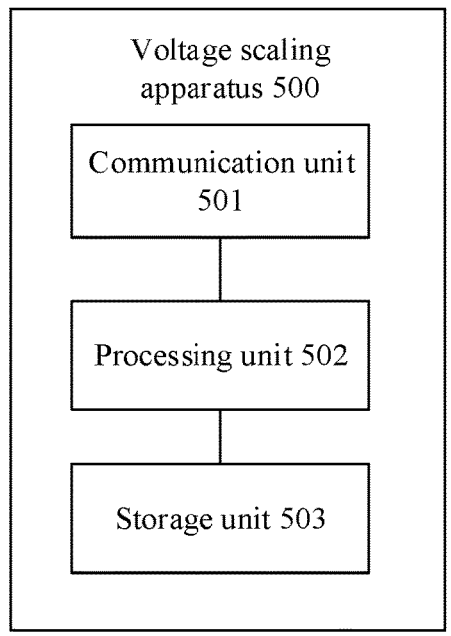
FIG. 19 is a schematic structural diagram of still another voltage scaling apparatus according to an embodiment of this application.

When an integrated unit is used, FIG. 19 shows a voltage scaling apparatus according to an embodiment of this application. As shown in FIG. 19, a voltage scaling apparatus 500 may include a communication unit 501. Optionally, the voltage scaling apparatus 500 may further include a processing unit 502.

In an example, as shown in FIG. 19, the voltage scaling apparatus 500 is a processor, or is a chip applied to the processor. In this case, the processing unit 502 is configured to support the voltage scaling apparatus in performing operation 100 performed by the processor in the foregoing embodiment. The communication unit 501 is configured to support the voltage scaling apparatus in performing operation 101 by the processor in the foregoing embodiment.

In a possible embodiment, as shown in FIG. 19, the processing unit 502 is further configured to support the voltage scaling apparatus in performing operation 100a or operation 100b and operation 104 that are performed by the processor in the foregoing embodiment.

In a possible embodiment, as shown in FIG. 19, the voltage scaling apparatus further includes a storage unit 503, configured to store a target correspondence. The processing unit 502 is further configured to support the voltage scaling apparatus in performing operation 1011A performed by the processor in the foregoing embodiment. The communication unit 501 is further configured to support the voltage scaling apparatus in performing operation 1012A performed by the processor in the foregoing embodiment.

In another possible embodiment, as shown in FIG. 19, the voltage scaling apparatus 500 further includes a storage unit 503, configured to store a target correspondence. The processing unit 502 is further configured to support the voltage scaling apparatus in performing operation 1011B performed by the processor in the foregoing embodiment, and the communication unit 501 is further configured to support the voltage scaling apparatus in performing operation 1012B performed by the processor in the foregoing embodiment.

In a possible embodiment, as shown in FIG. 19, the storage unit 503 is configured to store a target correspondence of a reference processor. The processing unit 502 is further configured to support the voltage scaling apparatus in performing operation 100c performed by the processor in the foregoing embodiment.

To cooperate with the processing unit 502 to perform a corresponding operation, the storage unit 503 is further configured to store a correspondence of differences of a plurality of processors or a correspondence of differences of a plurality of processors within a plurality of temperature intervals.

In another possible embodiment, as shown in FIG. 19, the storage unit 503 is configured to store target correspondences of a reference processor within a plurality of temperature intervals. The processing unit 502 is further configured to support the voltage scaling apparatus in performing operation 100d performed by the processor in the foregoing embodiment. To cooperate with the processing unit 502 to perform a corresponding operation, the storage unit 503 is further configured to store a correspondence of differences of a plurality of processors within a plurality of temperature intervals.

In still another possible embodiment, as shown in FIG. 19, the storage unit 503 is configured to store target correspondences of a plurality of processors. The processing unit 502 is further configured to support the voltage scaling apparatus in performing operation 100e performed by the processor in the foregoing embodiment. To cooperate with the processing unit 502 to perform a corresponding operation, the storage unit 503 is further configured to store performance difference information of a plurality of processors.

In still another possible embodiment, as shown in FIG. 19, the storage unit 503 is configured to store target correspondences of a plurality of processors within a plurality of temperature intervals. The processing unit 502 is further configured to support the voltage scaling apparatus in performing operation 100f performed by the processor in the foregoing embodiment. To cooperate with the processing unit 502 to perform a corresponding operation, the storage unit 503 is further configured to store performance difference information of a plurality of processors within a plurality of temperature intervals.

In another example, as shown in FIG. 19, the voltage scaling apparatus 500 is a power supply, or is a chip applied to the power supply. In this case, the communication unit 501 is configured to support the voltage scaling apparatus in performing operation 102 performed by the power supply in the foregoing embodiment. The processing unit 502 is configured to support the voltage scaling apparatus in performing operation 103 performed by the power supply in the foregoing embodiment.

In a possible embodiment, as shown in FIG. 19, the voltage scaling apparatus 500 may further include a storage unit 503, configured to store data such as a specified voltage slope that exists as a constant voltage slope and program code executable by the voltage scaling apparatus.

The processing unit 502 may be a processor or a controller, such as may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing unit 502 may implement or execute various example logical blocks, modules, and circuits described with reference to content disclosed in the present invention. The processing unit may be a combination implementing a computing function, for example, a combination of one or more microprocessors, or a combination of the DSP and a microprocessor. The communication unit may be a transceiver, a transceiver circuit, a communications interface, or the like. The storage unit may be a memory.

The communication unit may be a communications interface of the apparatus, and is configured to receive a signal from another apparatus. For example, when the apparatus is implemented in a chip manner, the communication unit is a communications interface that is used by the chip to receive a signal from another chip or apparatus or send a signal to another chip or apparatus.

When the processing unit 502 shown in FIG. 19 includes a VRM chip, a logic control circuit, and a buck converter, the communication unit 501 includes a communications interface and a power interface, and the storage unit 503 is a memory, the voltage scaling apparatus 500 in this embodiment of the present invention may be the power supply shown in FIG. 2.

When the processing unit 502 shown in FIG. 19 is a processor, the communication unit 501 is a communications interface, and the storage unit 503 is a memory, the voltage scaling apparatus 500 in this embodiment of the present invention may be the processor shown in FIG. 2.

Figure 20:
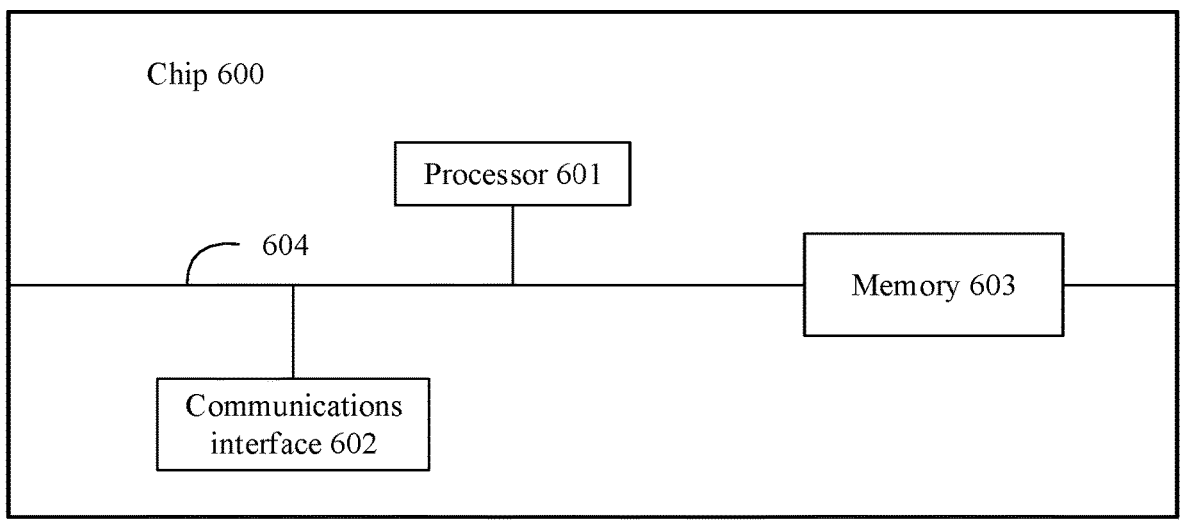
FIG. 20 is a schematic structural diagram of a chip according to an embodiment of this application.

FIG. 20 shows a schematic structural diagram of a chip. As shown in FIG. 20, a chip 600 includes one or more (including two) processors 601 and a communications interface 602.

Optionally, as shown in FIG. 20, the chip further includes a memory 603. The memory 603 may include a read-only memory and a random access memory, and provide an instruction and data to the processor 602. Apart of the memory 603 may further include a non-volatile random access memory (NVRAM).

In some embodiments, the memory 603 stores the following elements: an execution module or a data structure, a subset thereof, or an extended set thereof.

In this embodiment of this application, as shown in FIG. 20, the processor 601 invokes a target correspondence stored in the memory 603 to perform a corresponding operation.

In a possible embodiment, a structure of a chip used by a processor is similar to a structure of a chip used a power supply, and different apparatuses may use different chips to implement respective functions.

As shown in FIG. 20, the processor 601 controls a processing operation of any one of a processor and a power supply included in an electronic device in this embodiment of this application, and the processor 601 may further be referred to as a central processing unit (CPU).

As shown in FIG. 20, the memory 603 includes a read-only memory and a random access memory, and provide an instruction and data to the processor 603. A part of the memory 603 may further include an NVRAM. For example, the memory, the communications interface 602, and the memory 603 in an application are coupled together by using the bus system 604. In addition to a data bus, the bus system 604 may further include a power bus, a control bus, a status signal bus, and the like. However, for clear description, various types of buses in FIG. 20 are marked as the bus system 604.

In a possible embodiment, as shown in FIG. 20, the communications interface 602 is configured to support the chip in performing the receiving and sending operations of the processor and the power supply in the foregoing embodiment. The processor 601 is configured to support the chip in performing the processing operations of the processor and the power supply in the foregoing embodiment.

According to one aspect, a computer readable storage medium is provided, and an instruction is stored in the computer readable storage medium. When the instruction is run, functions of the processor shown in any one of FIG. 4, FIG. 5, and FIG. 10 to FIG. 12 are implemented.

According to another aspect, a computer readable storage medium is provided, and an instruction is stored in the computer readable storage medium. When the instruction is run, functions of the power supply shown in any one of FIG. 4, FIG. 5, and FIG. 10 to FIG. 12 are implemented.

According to one aspect, a computer program product including an instruction is provided. The computer program product includes an instruction. When the instruction is run, functions of the processor shown in any one of FIG. 4, FIG. 5, and FIG. 10 to FIG. 12 are implemented.

According to still another aspect, a computer program product including an instruction is provided. The computer program product includes an instruction. When the instruction is run, functions of the power supply shown in any one of FIG. 4, FIG. 5, and FIG. 10 to FIG. 12 are implemented.

According to one aspect, a chip is provided, and the chip is applied to a processor. The chip includes at least one processor and a communications interface, and the communications interface is coupled to the at least one processor. The processor is configured to run an instruction, so as to implement functions of the processor shown in any one of FIG. 4, FIG. 5, and FIG. 10 to FIG. 12.

According to still another aspect, a chip is provided, and the chip is applied to a power supply. The chip includes at least one processor and a communications interface, and the communications interface is coupled to the at least one processor. The processor is configured to run an instruction, so as to implement functions of the power supply shown in any one of FIG. 4, FIG. 5, and FIG. 10 to FIG. 12.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A voltage scaling method, comprising:
sending, by a processor of an electronic device, power supply scaling information to a power supply based on an operating frequency in a next time period, wherein the power supply scaling information comprises a specified supply voltage V of the operating frequency in the next time period which is defined as a specified supply voltage determined by the processor based on the operating frequency in the next time period, the operating frequency in the next time period is an operating frequency predicted based on a current operating frequency in a current time period, and the electronic device comprises the power supply; and
providing, by the power supply, a supply voltage $V_{out}$ to the processor determined based on the specified supply voltage V of the operating frequency in the next time period and a specified voltage slope R of the operating frequency in the next time period, wherein
the voltage slope is a decrease speed indicative of an amount of change of the supply voltage $V_{out}$ as a load current of the power supply increases; the supply voltage $V_{out}$ decreases as the load current increases; and
$V_{min} \leq V_{out} \leq V$, wherein $V_{min}$ is a lowest supply voltage for operation of the processor as the load current increases when the processor operates at the operating frequency in the next time period.

2. The method according to claim 1, wherein the supply voltage $V_{out}$=V−I*R, and I is the load current of the power supply.

3. The method according to claim 1, wherein the sending, by the processor, the specified supply voltage V of the processor at the operating frequency in the next time period to the power supply based on the operating frequency in the next time period comprises:
searching, by the processor, a target correspondence for the specified supply voltage V of the operating frequency in the next time period based on the operating frequency in the next time period, and sending the specified supply voltage V of the operating frequency in the next time period to the power supply, wherein the target correspondence is a predetermined correspondence among values of an operating frequency, a specified supply voltage, and a specified voltage slope that are of the processor, or a predetermined correspondence between values of an operating frequency and a specified supply voltage that are of the processor.

4. The method according to claim 1, wherein the specified voltage slope R of the operating frequency in the next time period exists in the power supply in a form of a constant voltage slope, and the constant voltage slope is a minimum value $R_{min}$ in voltage slopes allowed by the processor at specified supply voltages of all operating frequencies, wherein $R_{min}>0$.

5. The method according to claim 1, wherein the power supply scaling information further comprises the specified voltage slope R of the operating frequency in the next time period.

6. An electronic device, comprising:
a processor, configured to send power supply scaling information to a power supply based on an operating frequency in a next time period, wherein the power supply scaling information comprises a specified supply voltage V of the operating frequency in the next time period, which is defined as a specified supply voltage determined by the processor based on the operating frequency in the next time period, and the operating frequency in the next time period is an operating frequency predicted based on a current operating frequency in a current time period; and
the power supply, configured to provide a supply voltage $V_{out}$ to the processor based on the specified supply voltage V of the operating frequency in the next time period and a specified voltage slope R of the operating frequency in the next time period, wherein
the voltage slope is a decrease speed of the supply voltage $V_{out}$ as a load current of the power supply increases; the supply voltage $V_{out}$ decreases as the load current increases; and $V_{min} \leq V_{out} \leq V$, wherein $V_{min}$ is a lowest supply voltage for operation of the processor as the load current increases when the processor operates at the operating frequency in the next time period.

7. The device according to claim 6, wherein the supply voltage $V_{out}=V-I*R$, and I is the load current of the power supply.

8. The device according to claim 6, wherein the processor is further configured to:
search a target correspondence for the specified supply voltage V of the operating frequency in the next time period based on the operating frequency in the next time period, and
send the specified supply voltage V in the next time period to the power supply, wherein
the target correspondence is a predetermined correspondence among values of an operating frequency, a specified supply voltage, and a specified voltage slope that are of the processor, or a predetermined correspondence between values of an operating frequency and a specified supply voltage that are of the processor.

9. The device according to claim 8, wherein the processor is further configured to:
before sending the power supply scaling information to the power supply based on the operating frequency in the next time period, calibrate the target correspondence based on performance difference information causing a calibrated target correspondence to match the processor comprised in the electronic device, wherein the performance difference information comprises a delay time or an oscillation frequency.

10. The device according to claim 9, wherein the processor is further configured to:
search, based on the performance difference information, a correspondence between performance differences and lowest supply voltage differences that are of a plurality of processors for a lowest supply voltage difference that matches the performance difference information; and
calibrate a specified supply voltage of each operating frequency in the target correspondence based on the lowest supply voltage difference that matches the performance difference information causing the calibrated target correspondence to match the processor comprised in the electronic device; or
the processor is further configured to:
search, based on a current temperature, a correspondence between performance differences and lowest supply voltage differences that are of a plurality of processors within a plurality of temperature intervals for a correspondence between the performance differences and lowest supply voltage differences that are of the plurality of processors within a temperature interval of the current temperature;
search, based on the performance difference information, the correspondence between performance differences and lowest supply voltage differences that are of the plurality of processors within the temperature interval of the current temperature for a lowest supply voltage difference that matches the performance difference information; and
calibrate a specified supply voltage of each operating frequency in the target correspondence based on the lowest supply voltage difference that matches the performance difference information causing the calibrated target correspondence to match the processor comprised in the electronic device.

11. The device according to claim 8, wherein the target correspondence is a target correspondence of a reference processor, and the reference processor is a processor with a maximum lowest supply voltage in a plurality of processors at a same operating frequency.

12. The device according to claim 8, wherein the processor is further configured to:
before sending the power supply scaling information to the power supply based on the operating frequency in the next time period, search, based on a current temperature, target correspondences of a reference processor within a plurality of temperature intervals for a target correspondence, wherein the target correspondence is a target correspondence of the reference processor within a temperature interval of the current temperature, and the reference processor is a processor with a maximum lowest supply voltage in a plurality of processors at a same operating frequency.

13. The device according to claim 8, wherein the processor is further configured to:
before sending the power supply scaling information to the power supply based on the operating frequency in the next time period, search, based on performance difference information, target correspondences of a plurality of processors for a target correspondence that matches the processor comprised in the electronic device, wherein the performance difference information comprises a delay time or an oscillation frequency; or the processor is further configured to:
  before sending the power supply scaling information to the power supply based on the operating frequency in the next time period, search, based on a current temperature, target correspondences of a plurality of processors within a plurality of temperature intervals for target correspondences of the plurality of processors within a temperature interval of the current temperature; and search, based on performance difference information, the target correspondences of the plurality of processors within the temperature interval of the current temperature for a target correspondence that matches the processor comprised in the electronic device, wherein the performance difference information comprises a delay time or an oscillation frequency.

14. The device according to claim 6, wherein a specified voltage slope of the processor at each operating frequency is a voltage slope allowed by the processor at a specified supply voltage of the operating frequency; or specified voltage slopes of the processor at all operating frequencies are equal to a constant voltage slope; and the constant voltage slope is a minimum value $R_{min}$ in voltage slopes allowed by the processor at specified supply voltages of all the operating frequencies, wherein $R_{min}>0$.

15. The device according to claim 6, wherein the specified supply voltage of the processor at each operating frequency is $V_{(i)}$, $V_{(i)}=V_{min(i)}+\Delta V_{(i)}$, $V_{min(i)}$ is a lowest supply voltage for normal operation of the processor as the load current increases when the processor operates at each operating frequency, and $\Delta V_{(i)}$ is a supply voltage margin of the processor at each operating frequency.

16. The device according to claim 6, wherein the processor is further configured to: when determining that the operating frequency in the next time period is not equal to the current operating frequency, set the current operating frequency to be equal to the operating frequency in the next time period.

17. The device according to claim 6, wherein the specified voltage slope R of the operating frequency in the next time period exists in the power supply in a form of a constant voltage slope, and the constant voltage slope is a minimum value $R_{min}$ in voltage slopes allowed by the processor at specified supply voltages of all operating frequencies, wherein $R_{min}>0$.

18. The device according to claim 17, wherein the voltage slope allowed by the processor at the specified supply voltage of each operating frequency is $R_{(i)}$, $R_{(i)}=R_{max(i)}-\Delta R_{(i)}$, $R_{max(i)}$ is a maximum voltage slope of the processor at the specified supply voltage of each operating frequency, and $\Delta R_{(i)}$ is a voltage slope margin of the processor at each operating frequency.

19. The device according to claim 6, wherein the power supply scaling information comprises the specified voltage slope R of the operating frequency in the next time period.

20. The device according to claim 19, wherein the processor is further configured to:

search a target correspondence for the specified supply voltage V of the operating frequency in the next time period and the specified voltage slope R of the operating frequency in the next time period based on the operating frequency in the next time period, and send the specified supply voltage V of the operating frequency in the next time period and the specified voltage slope R of the operating frequency in the next time period to the power supply, wherein the target correspondence is a correspondence among an operating frequency, a specified supply voltage, and a specified voltage slope that are of the processor.

\* \* \* \* \*